(12) United States Patent
Ishii et al.

(10) Patent No.: US 8,601,901 B2
(45) Date of Patent: Dec. 10, 2013

(54) TELESCOPIC STEERING COLUMN APPARATUS

(75) Inventors: Toru Ishii, Maebashi (JP); Yasuo Koike, Maebashi (JP)

(73) Assignee: NSK Ltd., Tokyo (JP)

( * ) Notice: Subject to any disclaimer, the term of this patent is extended or adjusted under 35 U.S.C. 154(b) by 604 days.

(21) Appl. No.: 12/675,214

(22) PCT Filed: Jun. 5, 2009

(86) PCT No.: PCT/JP2009/060387
§ 371 (c)(1),
(2), (4) Date: Jul. 7, 2010

(87) PCT Pub. No.: WO2009/157294
PCT Pub. Date: Dec. 30, 2009

(65) Prior Publication Data
US 2010/0294072 A1 Nov. 25, 2010

(30) Foreign Application Priority Data
Jun. 24, 2008 (JP) .................................. 2008-164369

(51) Int. Cl.
*B62D 1/18* (2006.01)
(52) U.S. Cl.
USPC .......................................... 74/493; 280/775
(58) Field of Classification Search
USPC .......................................... 74/493; 280/775
See application file for complete search history.

(56) References Cited

U.S. PATENT DOCUMENTS

| 5,199,319 | A  | * | 4/1993  | Fujiu   | 74/493  |
| 5,979,265 | A  | * | 11/1999 | Kim et al. | 74/493 |
| 6,276,719 | B1 | * | 8/2001  | Gartner | 280/775 |
| 7,178,832 | B2 |   | 2/2007  | Ohtsu   |         |
| 7,677,132 | B2 | * | 3/2010  | Oh      | 74/493  |

(Continued)

FOREIGN PATENT DOCUMENTS

| JP | 11-78654 | 3/1999 |
| JP | 3783524  | 6/2006 |

(Continued)

OTHER PUBLICATIONS

International Search Report dated Sep. 1, 2009, from the corresponding International Application.

*Primary Examiner* — Justin Krause
(74) *Attorney, Agent, or Firm* — Katten Muchin Rosenman LLP

(57) ABSTRACT

To realize a practical structure capable of increasing the number of frictional engagement sections between members that are relatively displaced in response to adjustment of a front-rear position of a steering wheel, in a portion of a front end section of an outer column 11b that opposes to an intermediate section of an adjustment bolt 17a, there is formed a slit 33 that is long in the axial direction of this outer column 11b, and in a portion of the intermediate section of the adjustment bolt 17a that opposes to this outer column 11b, there is provided a pressing member 37, this pressing member 37 pressing the outer circumferential surface of the outer column 11b radially inward, with the rotation of the adjustment bolt 17a, and when fixing the front-rear position, with the rotation of the adjustment bolt 17a, a pair of supporting plate sections 23, which constitute a nipping (fixed) bracket 22a, nipping a nipped (movable) bracket 24a, and at the same time, the pressing member 37 bringing the inner circumferential surface of the outer column 11b and the outer circumferential surface of an inner column 12b into frictional engagement.

14 Claims, 25 Drawing Sheets

(56) References Cited

U.S. PATENT DOCUMENTS 8,037,782 B2 * 10/2011 Uesaka ........................... 74/493
8,056,436 B2 * 11/2011 Marable et al. ................. 74/493
2006/0028010 A1 * 2/2006 Yamada ....................... 280/775

FOREIGN PATENT DOCUMENTS

| JP | 2006-206050 | 8/2006 |
| JP | 2007223549 | 9/2007 |
| JP | 2008-132819 | 6/2008 |

* cited by examiner

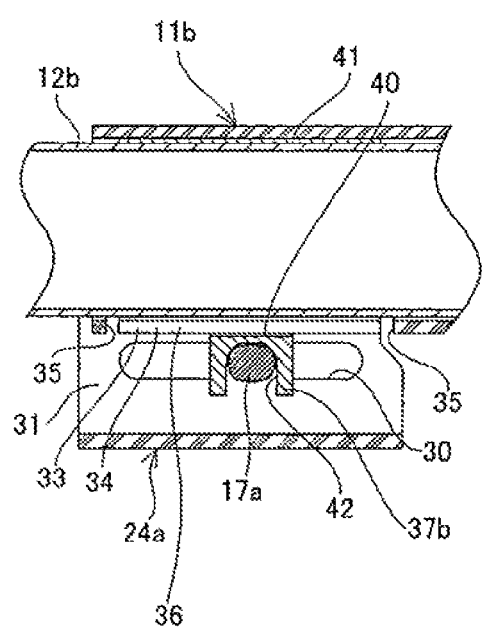
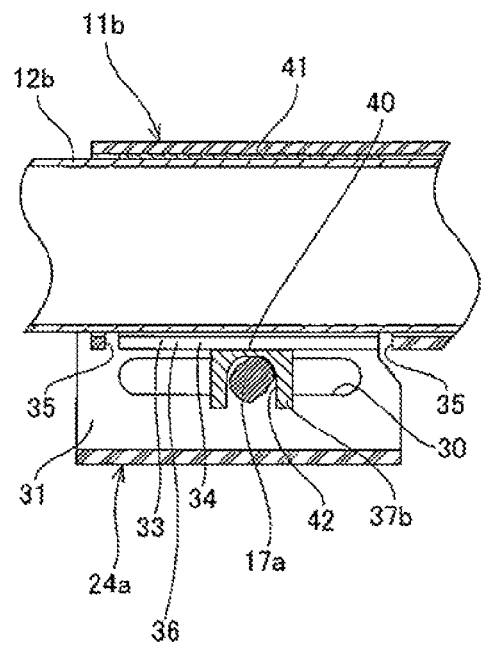
Fig.9(A)
Fig.9(B)

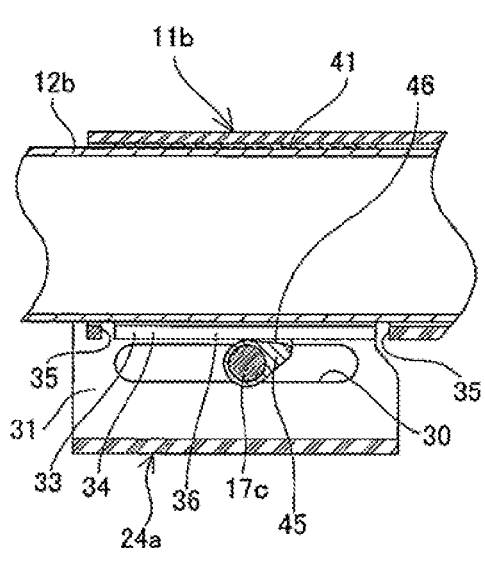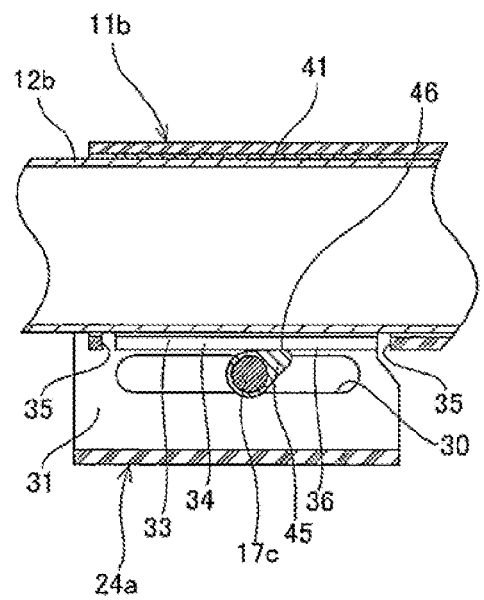

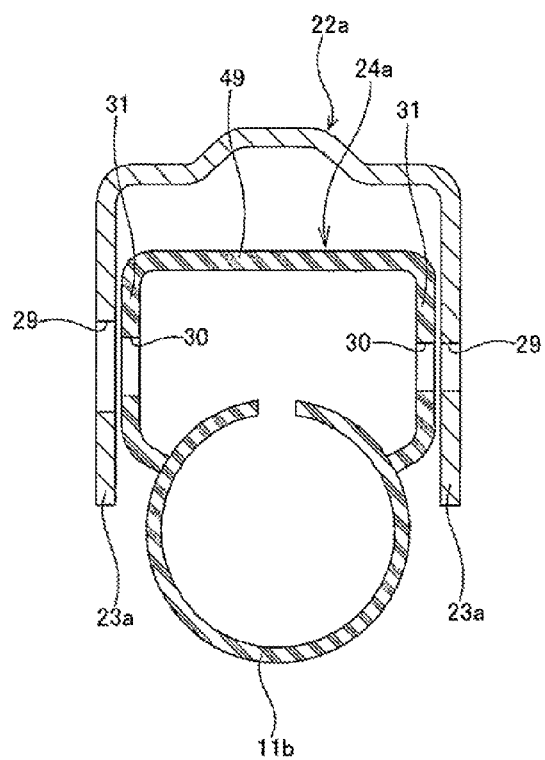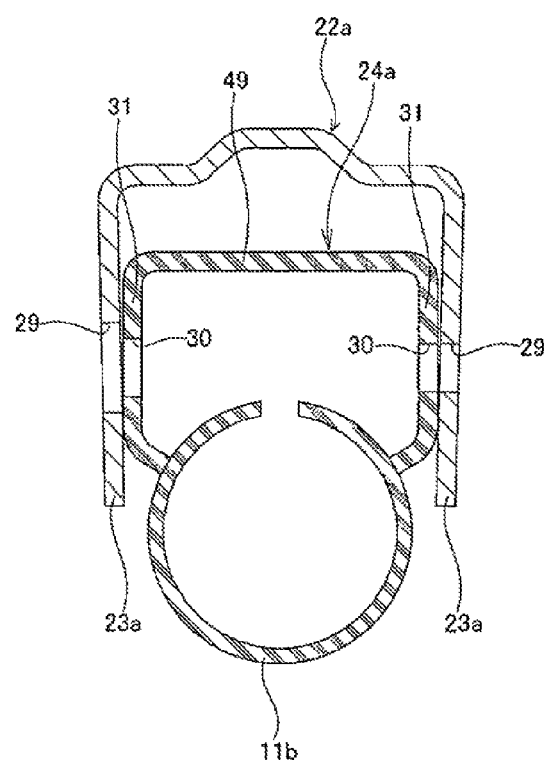

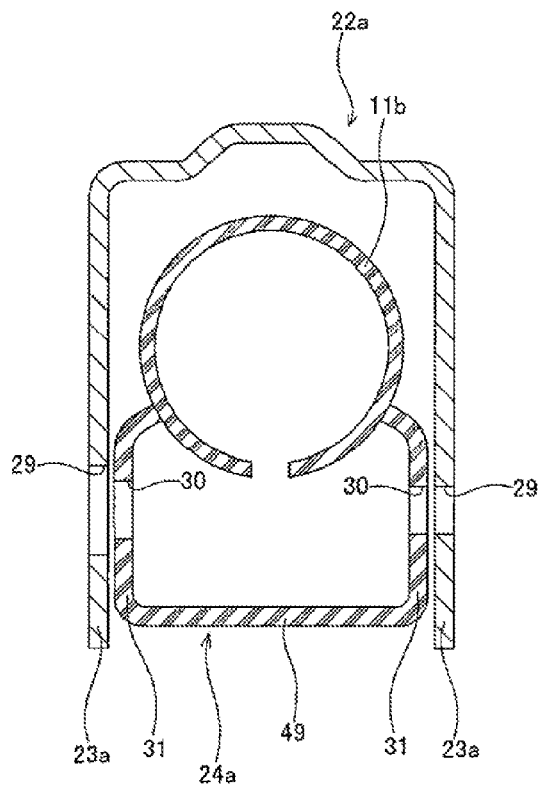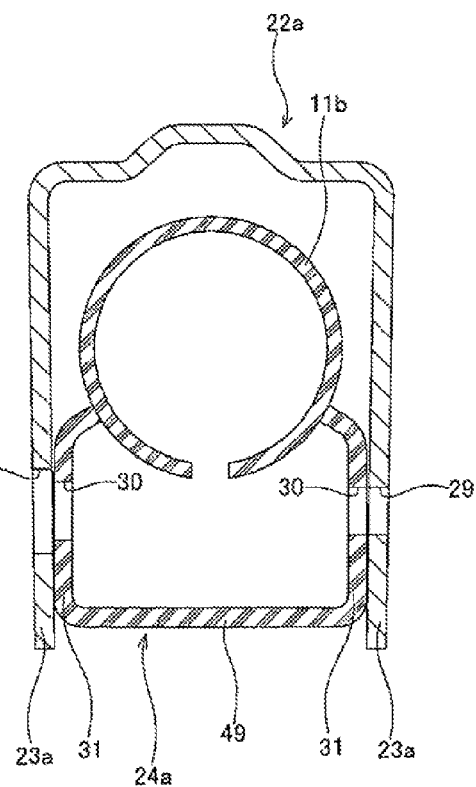

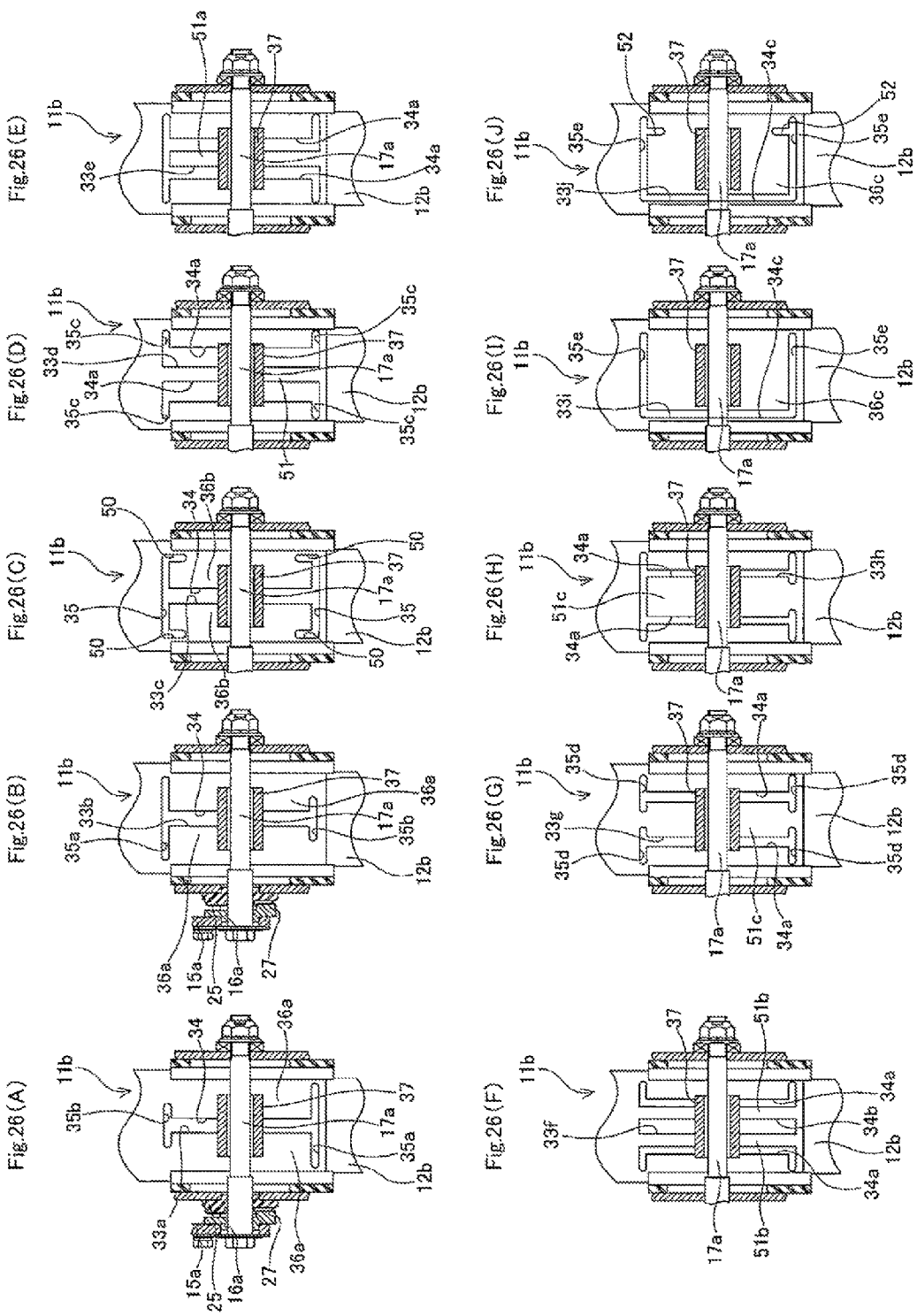

TELESCOPIC STEERING COLUMN APPARATUS

TECHNICAL FIELD

The present invention relates to an improvement for a telescopic steering column apparatus for adjusting the front-rear position of a steering wheel. Specifically, the present invention is to realize a structure capable of increasing retentive force for fixing the front-rear position of the steering wheel in a post-adjustment position.

BACKGROUND ART

A steering apparatus for an automobile is configured as illustrated in FIG. 28 in which rotation of a steering wheel 1 is transmitted to an input shaft 3 of a steering gear unit 2, and a pair of left and right tie rods 4 are pushed or pulled in response to rotation of this input shaft 3 to thereby give a steering angle to front wheels. The steering wheel 1 is supported and fixed on the rear end section of a steering shaft 5, and this steering shaft 5, in a state of being inserted through a cylindrical steering column 6 in the axial direction, is rotatably supported on this steering column 6. Moreover, the front end section of the steering shaft 5 is connected, via a universal joint 7, to the rear end section of an intermediate shaft 8, and the front end section of this intermediate shaft 8 is connected, via another universal joint 9, to the input shaft 3.

There have been widely and conventionally known a tilting mechanism for adjusting the upper-lower position and front-rear position, and a telescopic mechanism for adjusting the front-rear position of the steering wheel 1, according to the physique or driving posture of a driver. Moreover, in the example illustrated in the drawing, there is also assembled an electrically driven power steering apparatus that reduces, with an electric motor 10 serving as an auxiliary power source, a force required for operating the steering wheel 1. Furthermore, in order to configure the above telescopic mechanism, the steering column 6 has a structure in which an outer column 11 and an inner column 12 are telescopically combined in a telescopic form, and the steering shaft 5 has a structure in which an outer tube 13 and an inner shaft 14 are torque-transmittably and telescopically combined by means of spline engagement or the like.

In the case of the tilting mechanism or the telescopic mechanism, except for ones of an electrically driven type, the position of the steering wheel 1 can be brought to an adjustable state or can be fixed in a post-adjustment position, based on an operation of an adjustment lever. As a structure for increasing a force (retentive force) for retaining the front-rear position of the steering wheel in a post-adjustment position without particularly increasing the force for operating the adjustment lever, there has been conventionally disclosed, for example as in Patent Documents 1 to 3, a structure for fixing the front-rear position of a movable column in accordance with rotation of a rod-shaped member based on an adjustment lever. In Patent Document 1 among these, there is disclosed a structure in which a movable column is nipped from both sides thereof and a non-moving column is pressed against the movable column to thereby ensure a retentive force with respect to this movable column.

FIG. 29 and FIG. 30 show such conventional structure disclosed in Patent Document 1. In the case of this conventional structure, with a cam device 16 that functions upon operation of an adjustment lever 15, it is possible to freely increase and reduce the distance between a first pressing plate 18 externally fitted on a portion close to the base end of an adjustment bolt 17, and a second pressing plate 19 externally fitted on a portion close to the tip end of this adjustment bolt 17. Moreover, a cam member 20 is externally fitted and supported on an intermediate section of this adjustment bolt 17 based on serration engagement. The tip end section of this cam member 20, through a long hole 21 formed in an intermediate section of an outer column 11a, enters into this outer column 11a, and comes in contact with the outer circumferential surface of an inner column 12a. As the adjustment lever 15 is operated, the cam device 16 reduces the distance between both of the first and second pressing plates 18 and 19, and thereby a pair of supporting plate sections 23 that constitute a nipping bracket 22 supported on a vehicle body side, is pressed against both of the side surfaces of a nipped bracket 24 fixed on the outer circumferential surface of the outer column 11a. At the same time, the tip end section of the cam member 20 presses the inner column 12a.

In the case of such conventional structure disclosed in Patent Document 1, compared to a structure prior thereto (former structure), strength and rigidity for fixation of this front-rear position can be made higher by increasing the number of frictional engagement sections in a case of fixing the front-rear position of the steering wheel 1. That is to say, in the case of the former structure, fixation of the front-rear position of the steering wheel 1 was realized only with frictional engagement in a contact section between inner side surfaces of the pair of supporting plate sections 23 that constitute the nipping bracket 22 and both of the side surfaces of the nipped side bracket 24 fixed on the outer circumferential surface of the outer column 11a. On the other hand, in the case of the conventional structure disclosed in Patent Document 1, frictional engagement between the inner circumferential of the outer column 11a and the outer circumferential surface of the inner column 12a, associated with pressing of the cam member 20, also contributes to fixation of the front-rear position.

The tip end surface of the cam member 20 and the outer circumferential surface of the inner column 12a also come in contact with each other, however, both of these members 20 and 12a will not be displaced relatively in response to an adjustment of the front-rear position of the steering wheel 1. Therefore, contact between both of the members 20 and 12a will not contribute to increase strength and rigidity for fixation of the front-rear position.

[Patent Document 1] Japanese Patent No. 3,783,524
[Patent Document 2] Japanese Patent Application Publication No. 2007-223549
[Patent Document 3] U.S. Pat. No. 7,178,832

DISCLOSURE OF THE INVENTION

Problems to be Solved by the Invention

In a case where requirement in performance of the telescopic steering column apparatus becomes higher and strength and rigidity for fixing the front-rear position of the steering wheel need to be made higher, it may be considered to increase the number of friction engagement sections between members that are relatively displaced in response to adjustment of this front-rear position.

The present invention takes into consideration the above circumstances, with an object of realizing a practical structure capable of further increasing the number of frictional engagement sections between members that are relatively displaced in response to adjustment of the front-rear position of the steering wheel.

Means for Solving the Problem

A telescopic steering column apparatus of the present invention, as with the conventionally known telescopic steering column apparatus mentioned above, is provided with an inner column, an outer column, a nipped bracket, a nipping bracket, a rod-shaped member, a pair of pressing sections, and an engagement/disengagement device.

Among these, the inner column is of a cylindrical shape.

Moreover, the outer column is of a cylindrical shape having a diameter greater than that of the inner column, and is externally fitted on this inner column so as to be able to be displaced in the axial direction.

Furthermore, the nipped bracket is fixed on a lower surface or upper surface of a portion of the outer column that is externally fitted on the inner column, and has a widthwise dimension greater than the outer diameter of the outer column.

Moreover, the nipping bracket has a pair of supporting plate sections that nip the nipped bracket from both sides thereof in the widthwise direction, and is supported on a vehicle body.

Furthermore, the rod-shaped member is inserted through through-holes provided in mutually matching portions on the nipped bracket and the nipping bracket, in the widthwise direction of this nipped bracket.

Moreover, both of the pressing sections are provided on portions that oppose, on both of the end sections of the rod-shaped member, to the outer side surfaces of both of the supporting plate sections.

Furthermore, the engagement/disengagement device increases or reduces the distance between both of the pressing sections as the rod-shaped member is rotated in the torsional direction, to thereby engage or disengage the inner side surfaces of both of the supporting plate sections and both of the side surfaces of the nipped bracket.

Generally, the outer column is of a structure in which the front end section thereof is externally fitted on the rear end section of the inner column, that is to say, the inner column is arranged on the front side and the outer column is arranged on the rear side (steering shaft side). However, the present invention is not limited to this, and may be applied to a structure in which the outer column has the rear end section thereof externally fitted on the front end section of the inner column, that is to say, the outer column is arranged on the front side and the inner column is arranged on the rear side (steering shaft side).

In the former case, in order to enable front-rear movement of the outer column, at least either one of the holes provided in both of the supporting plate sections and the holes provided in the nipped bracket (movable bracket), is made as a long hole that is long in the axial direction of the outer column.

In particular, in the telescopic steering column apparatus of the present invention, in a portion of the front end section of the outer column that opposes to the intermediate section of the rod-shaped member, there is formed a slit that is long in the axial direction of this outer column. In a portion of the intermediate section of the rod-shaped member that opposes to this outer column, there is provided a pressing member that, in response to rotation of this rod-shaped member, presses the outer circumferential surface of this outer column radially inward.

In a case of implementing the telescopic steering column apparatus of the present invention configured as described above, in a first aspect of the present invention, a distance between the rotational center axis of the rod-shaped member and the outer circumferential surface of the portion of the intermediate section of this rod-shaped member that opposes to the outer circumferential surface of the outer column, is unequal about the rotational direction of this rod-shaped member. Moreover, the pressing member is arranged between the intermediate section of this rod-shaped member and the outer column. With rotation of the rod-shaped member in a direction of reducing the distance between the pair of pressing sections, the outer circumferential surface of the intermediate section of this rod-shaped member presses the pressing member toward the portion of the outer circumferential surface of the outer column where the slit is formed (the portion that has become likely to elastically deform in the radial direction due to this slit).

In a case of implementing this invention of the first aspect, specifically, in a portion of the pressing member that opposes to the outer column, there is provided a partly cylindrical-surfaced concave section in which, in the axial direction of the rod-shaped member, the center section thereof is deep and it gradually becomes shallower as it gets closer to both of the end sections. This concave section is brought into contact with the outer circumferential surface of the outer column in a state of bridging over both of the side portions of the slit.

Alternatively, in portions in two positions distanced from each other in the axial direction of the rod-shaped member that oppose to both of the side portions of the slit of the outer column, there are provided the pair of pressing members in a state of preventing displacement in a direction of moving away from each other. Parts of both of these pressing members are brought into contact with both of the side portions of the slit of the outer circumferential surface of the outer column.

In this case, preferably, the side surfaces on mutually opposite sides of both of the pressing members are respectively brought into contact with the inner side surfaces of a pair of side plate sections that constitute the nipped bracket (movable bracket).

In a case of implementing the telescopic steering column apparatus of the present invention configured as described above, in a second aspect of the present invention, the pressing member is a cam member that is supported on the intermediate section of the rod-shaped member and that rotates together with this rod-shaped member. With rotation of this rod-shaped member in a direction of reducing the distance between both of the pressing sections, the cam member presses a portion on the outer circumferential surface of the outer column where the slit is formed.

In a case of carrying out this invention of the second aspect, specifically, in a portion of the cam member that opposes to the outer column, there is provided an arc-shaped concave section in which, in the axial direction of the rod-shaped member, the center section thereof is deep and it gradually becomes shallower as it gets closer to both of the end sections. This concave section is brought into contact with the outer circumferential surface of the outer column in a state of spanning both of the side portions of the slit.

Alternatively, in portions in two positions distanced from each other in the axial direction of the rod-shaped member that oppose to both of the side portions of the slit of the outer column, there are provided a pair of the cam members in a state of preventing displacement in a direction of moving away from each other. With the tip end section of both of these cam members, both of the side portions of the slit on the outer circumferential surface of the outer column are pressed.

In this case, preferably, the side surfaces on mutually opposite sides of both of the cam members are respectively brought into contact with the inner side surfaces of a pair of supporting plate sections that constitute the nipping bracket (fixed bracket).

Alternatively, in a case of carrying out the invention of the second aspect, the cam members are made as an integrated type in which a pair of cam pieces are joined and fixed with a joining section. With the tip end section of both of these cam pieces or with the tip end edge of this joining section, both of the side portions of the slit on the outer circumferential surface of the outer column are pressed.

In a case of applying the present invention to a structure in which the outer column has the rear end section thereof externally fitted on the front end section of the inner column, that is to say, the outer column is arranged on the front side and the inner column is arranged on the rear side (steering shaft side), front-rear movement of the inner column is possible by changing an amount of insertion of the inner column front end section on the rear side into the outer column rear end section on the front side. In this case, neither the nipping bracket nor the nipped bracket moves in the axial direction of the outer column, and therefore, neither the holes provided in both of the supporting plate sections nor the holes provided in the nipped bracket need to be made as long holes that are long in the axial direction of the outer column. Either one of the above aspects may also be applied to the structure in this case.

Moreover, in a case of carrying out the present invention, the first aspect and the second aspect may be carried out at the same time. That is to say, a distance between the rotational center axis of the rod-shaped member, and the outer circumferential surface of a portion of the intermediate section of this rod-shaped member that opposes to the outer circumferential surface of the outer column, is unequal about the rotational direction of this rod-shaped member. Furthermore, another pressing member, which is a separate member from the cam member, is arranged between the intermediate section of this rod-shaped member and the outer column. With rotation of the rod-shaped member in a direction of reducing the distance between both of the pressing sections, the outer circumferential surface of the outer column is pressed by the cam member, and at the same time, the pressing member is pressed toward a portion of the outer circumferential surface of this outer column where the slit is formed, by the outer circumferential surface of the intermediate section of the rod-shaped member.

Effect of the Invention

According to the telescopic steering column apparatus of the present invention configured as described above, it is possible, compared to the conventional structure disclosed in Patent Document 1 described above, to increase the number of frictional engagement sections between the members that are relatively displaced in response to adjustment of the front-rear position of the steering wheel. Therefore, even in a case where requirement in performance of the telescopic steering column apparatus becomes higher and the strength and rigidity for fixing the front-rear position of the steering wheel need to be made higher, this requirement can be sufficiently met.

BRIEF DESCRIPTION OF THE DRAWINGS

FIG. 9a shows the third embodiment and includes a sectional view of FIG. 8 where the front-rear position of a steering wheel is adjusted, and FIG. 9b shows the third embodiment and includes a sectional view of FIG. 8 where the front-rear position of a steering wheel is fixed in a post-adjustment position.

FIG. 14a shows the seventh embodiment and includes a sectional view of FIG. 13 where the front-rear position of a steering wheel is adjusted, and FIG. 14b shows the seventh embodiment and includes a sectional view of FIG. 13 where the front-rear position of a steering eel is fixed in a post-adjustment position.

FIG. 21a includes substantially sectional view of an effect of the tenth embodiment showing a state where the front-rear position of the steering wheel is adjusted, and FIG. 21b includes substantially sectional view of an effect of the tenth embodiment showing a state where the steering wheel is fixed in a post-adjustment position.

FIG. 22 is a drawing, which is similar to FIG. 21, for describing a case of the third embodiment.

FIGS. 26a-26j are drawings similar to FIG. 2, showing another ten embodiments related to the shape of slits.

FIG. 5a includes partly omitted sectional views of a structure of FIG. 26d showing a state where the front-rear position of the steering wheel is adjusted, and FIG. 5b includes partly omitted sectional views of a structure of FIG. 26d showing a state where the front-rear position of the steering wheel is adjusted.

DESCRIPTION OF THE REFERENCE SYMBOLS

Figure 1:
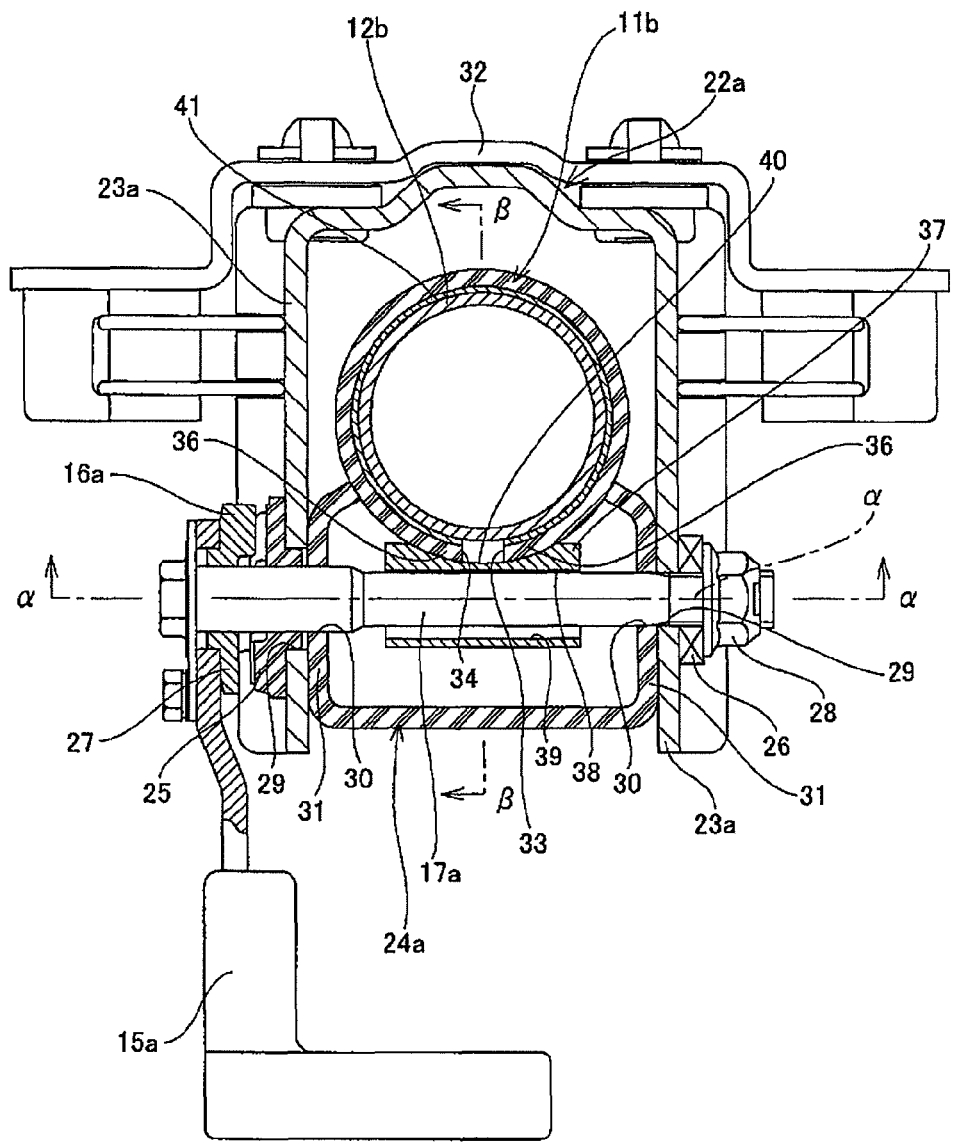
FIG. 1 is a sectional view similar to FIG. 30, showing a first embodiment of the present invention.

1 Steering wheel
2 Steering gear unit
3 Input shaft
4 Tie rod
5 Steering shaft
6 Steering column
7 Universal joint
8 Intermediate shaft
9 Universal joint
10 Electric motor
11, 11a, 11b, 11c Outer column
12, 12a, 11b, 11c Inner column
13 Outer tube
14 Inner shaft
15, 15a Adjustment lever
16, 16a Cam device
17, 17a, 17b, 17c Adjustment bolt
18 First pressing plate
19 Second pressing plate
20 Cam member
21 Long hole
22, 22a, 22b Nipping bracket
23, 23a Supporting plate section
24, 24a, 22b Nipped bracket
25 Non-rotating cam plate
26 Thrust bearing
27 Rotating cam plate
28 Nut
29 Through hole
30 Long hole
30a Round hole
31 Side plate section
32 Attachment section
33, 33a-33j Slit
34, 34a-34c Principle section
35, 35a-35e Sub-section
36, 36a-36c Elastic deformation section
37, 37a-37d Pressing member
38 Flat surface
39, 39a Insertion hole
40 Concave section
41 Sleeve
42 Engagement concave section
43 Step section
44 Large diameter section
45, 45a, 45b Cam member
46 Concave section
47 Cam piece
48 Joining section
49 Joining plate section
50 Bent section
51, 51a-51c Center deformation section
52 Cutout section

BEST MODE FOR CARRYING OUT THE INVENTION

First Example of an Embodiment

FIG. 1 to FIG. 4 show a first embodiment of the present invention, corresponding to a first aspect. As with the telescopic steering column apparatus disclosed in Patent Document 1 mentioned above, a telescopic steering column apparatus of the present example is configured so as to combine, in a telescopic form: a rear end section of an inner column 12b that is provided on the front side and that will not be displaced in the axial direction (front-rear direction) even when adjusting the front-rear position of a steering wheel; and a front end section of an outer column 11b that is provided on the rear side and that is displaced in the axial direction (front-back direction in FIG. 1, upper-lower direction in FIG. 2, and left-right direction in FIG. 3) when adjusting the front-rear position of the steering wheel, while allowing them to be relatively displaced in the axial direction. The front-rear position of the steering wheel is adjusted by displacing the outer column 11b in the axial direction, and the front-rear position of this steering wheel can be fixed in a post-adjustment position by preventing axial direction displacement of this outer column 11b.

In the example shown in the drawing, between a rear end section outer circumferential surface of the inner column 12b and a front end section inner circumferential surface of the outer column 11b, there is nipped a sleeve 41 formed in a cut-cylinder shape with a highly slidable or rust-proof material (or a material having both of these characteristics) such as synthetic resin and stainless steel plate. However, such sleeve 41 may be omitted, and the rear end section of the inner column 12b and the front end section of the outer column 11b may be directly fitted together. In the following description, even in a case where the rear end section outer circumferential surface of the inner column 12b and the front end section inner circumferential surface of the outer column 11b are opposed to each other or are friction engaged with each other via the sleeve 41, this sleeve 41 is omitted, and both of the circumferential surfaces are described to be in a contact with each other or be friction engaged with each other.

In order to enable front-rear position adjustment of the outer column 11b described above, a nipping bracket 22a, which is a fixed bracket, is supported on a vehicle body in a lower side portion of a dashboard. Moreover, there is a nipped bracket 24a, which is a movable bracket, weld-fixed on the front end section of the outer column 11b, in a state of projecting downward. This nipped bracket 24a is supported with respect to the nipping bracket 22a. This nipping bracket 22a is configured such that a pair of mutually parallel supporting plate sections 23a is provided on the underside of an attachment section 32 to be supported on the vehicle body. Moreover, the width of the nipping bracket 24a is greater than the outer diameter of the outer column 11b so that mutually parallel side plate sections 31, in both of the end sections of this nipped bracket 24a, project sideward from the outer column 11b in the widthwise direction. Therefore, in a state where this outer column 11b and the nipped bracket 24a are arranged between both of the supporting plate sections 23a, the outer side surface of both of the side plate sections 31 are in contact with the inner side surface of both of the supporting plate sections 23a. The outer circumferential surface of the outer column 11b will not be in contact with the inner side surface of both of the supporting plate sections 23a.

In order to enable position adjustment of the nipped bracket 24a with respect to the nipping bracket 22a in the axial direction of the outer column 11b and to enable it to be fixed in a post-adjustment position, the nipped bracket 24a is joined with the nipping bracket 22a by an adjustment bolt 17a, which is a rod-shaped member. A cam device 16a, which is an engagement/disengagement device functioning with operation of an adjustment lever 15a, enables adjustment of the axial position of the outer column 11b with respect to the inner column 12b, and it enables it to be fixed in a post-adjustment position. Therefore, by operating the adjustment lever 15a, it is possible to freely extend or reduce the distance between a non-rotating cam plate 25 externally fitted on a portion close to the base end of the adjustment bolt 17a, and a thrust bearing 26 externally fitted on a portion close to the tip end of this adjustment bolt 17a, which serve as a pair of pressing members. This adjustment bolt 17a is rotated in the torsion direction with operation of the adjustment lever 15a. Moreover, a rotating cam plate 27 that constitutes the cam device 16a with the non-rotating cam plate 25, rotates together with the adjustment lever 15a (and the adjustment bolt 17a). Furthermore, a nut 28 screwed on the tip end section of this adjustment bolt 17a prevents the thrust bearing 26 from being displaced in a direction of moving away from the non-rotating cam plate 25.

The adjustment bolt 17a is inserted through: circular through holes 29 that are respectively formed in mutually aligned positions on the pair of supporting plate sections 23a that constitute the nipping bracket 22a; and long holes 30 that are respectively formed in portions of the nipped bracket 24a aligned with both of these through holes 29 and that are long in the axial direction of the outer column 11b. The non-rotating cam member 25 and the thrust bearing 26 are provided on the opposite side of the outer column 11b across both of the supporting plate sections 23a. Both of the long holes 30 are formed in both portions of the side plate sections 31.

Figure 2:
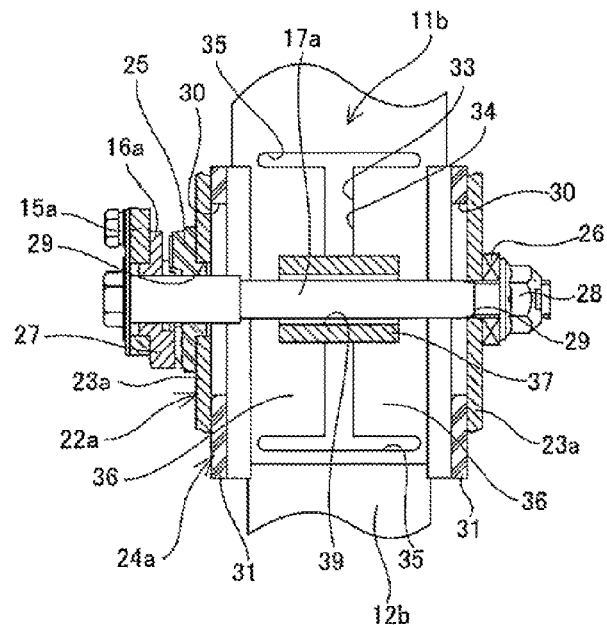
FIG. 2 is a sectional view taken along the line α-α of FIG. 1, showing the first embodiment.

On the front end section lower surface of the outer column 11b, in a portion, the axial position of which is aligned with both of the long holes 30, there is formed a wide H shaped (or I shaped) slit 33 shown in FIG. 2 so that the portion can easily elastically deform. This slit 33 is formed with a principle section 34 that is formed on the lower end section of the outer column 11b and that is long in the axial direction of this outer column 11b, and a pair of sub-sections 35 that extend from both ends of this principle section 34 toward both sides in the circumferential direction. The rigidity, in the radial direction of the outer column 11b, of an elastic deformation section 36 surrounded from three directions by these principle section 34 and the sub-sections 35, is reduced. In order to reduce the distance between the non-rotating cam plate 25 and the thrust bearing 26, the adjustment bolt 17a is rotated by the adjustment lever 15a to thereby press both of the elastic deformation sections 36 radially inward (upward) of the outer column 11b toward the outer circumferential surface of the inner column 12b.

Figure 4A:
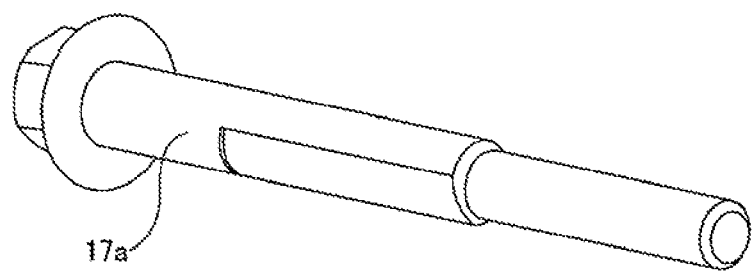
FIG. 4a shows the first embodiment and includes a perspective view of an adjustment bolt.
Figure 4B:
FIG. 4b shows the first embodiment and includes a sectional view of an axially intermediate section of this adjustment bolt.

For this reason, in the case of this example, as the adjustment bolt 17a, there is used one with a non-column shaped portion that opposes to (is positioned immediately below), in the axially intermediate section, both of the elastic deformation sections 36. Specifically, the sectional shape of this portion is an oval shape or a substantially oval shape as shown in FIG. 4(B). Therefore, the distance (radius) between the rotational center axis α of the adjustment bolt 17a (refer to FIG. 1) and the outer circumferential surface of the axially intermediate section of the adjustment bolt 17a, is unequal about the rotational direction of this adjustment bolt 17a. In other words, the axially intermediate section of this adjustment bolt 17a has a cam structure for displacing the member engaged with this axially intermediate section in the radial direction of this adjustment bolt 17a, based on rotation of this adjustment bolt 17a. Moreover, with a pressing member 37 that is externally loosely fitted on the axially intermediate section of this adjustment bolt 17a, both of the elastic deformation sections 36 can be freely pressed based on the rotation of the adjustment bolt 17a.

Figure 3A:
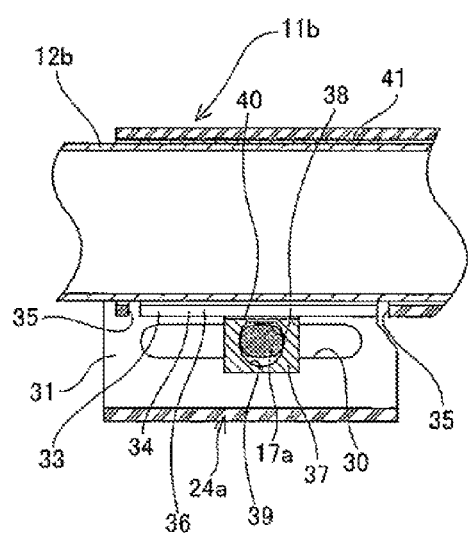
FIG. 3a shows the first embodiment and includes a sectional view taken along the line β-β of FIG. 1 where the front-rear position of a steering wheel is adjusted.
Figure 3B:
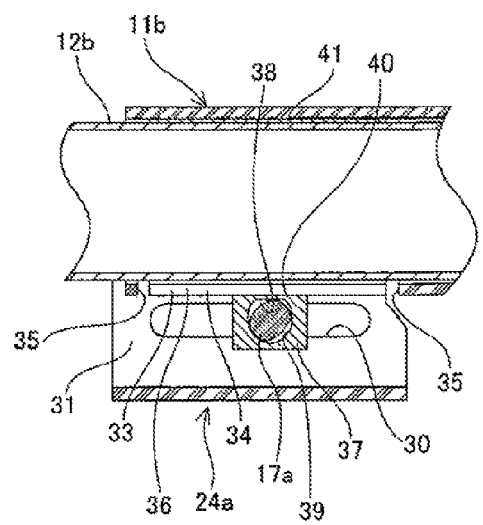
FIG. 3b shows the first embodiment and includes a sectional view taken along the line β-β of FIG. 1 where the front-rear position of a steering wheel is fixed in a post-adjustment position.
Figure 4C:
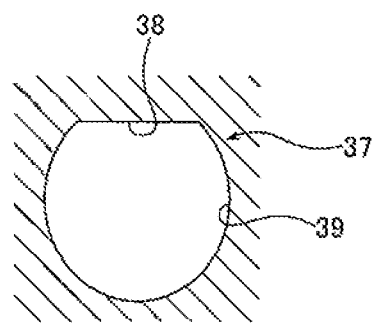
FIG. 4c shows the first embodiment and includes a sectional view of an insertion hole of a pressing member.

Therefore, as shown in FIG. 4(C), in the pressing member 37, there is formed an insertion hole 39, the upper end section of which serves as a flat surface 38 and the other portion of which is of a partly cylindrical surface. The axially intermediate section of this adjustment bolt 17a is loosely inserted through this insertion hole 39. Moreover, on the upper surface of the pressing member 37, that is, the portion opposed to the outer column 11b, there is provided a partly cylindrical concave section 40. This concave section 40 has a shape which corresponds to the outer circumferential surface of this outer column 11b (which has a reversed concave/convex shape and the curvature radius of which substantially matches therewith), and the center section thereof is deep about the axial direction of the adjustment bolt 17a (left-right direction in FIG. 1 and FIG. 2, and front-back direction in FIG. 3) and it gradually becomes shallower as it gets closer to both of the end sections. Such concave section 40, in a state where the pressing member 37 is installed between the adjustment bolt 17a and the outer column 11b, that is to say, in a state of spanning both of the elastic deformation sections 36, closely opposes to or comes in contact with both of the side portions of the principle section 34 of the slit 33 of the outer circumferential surface of this outer column 11b.

Hereunder, there is described an effect of the telescopic steering column apparatus of the present example configured as described above.

First, when adjusting the front-rear position of the steering wheel, the adjustment lever 15a is operated in a predetermined direction to thereby extend the distance between the non-rotating cam plate 25 and the thrust bearing 26. In this state, the frictional engagement between the inner side surface of both of the supporting plate sections 23a that constitute the nipping bracket 22a, and the outer side surface of both of the side plate sections 31 that constitute the nipped bracket 24a, is released (contact pressure between these side surfaces is reduced or lost). Moreover, in this state, as shown in FIG. 3(A), the major axis direction of the sectionally non-circular portion of the axially intermediate section of the adjustment bolt 17a matches with the axial direction of the outer column 11b. In other words, the minor axis of the sectionally non-circular portion is positioned in the radial direction of this outer column 11b (in the upper-lower direction in FIG. 3). As a result, the pressing member 37 is lowered, and the force of this pressing member 37 pressing both of the elastic deformation sections 36 is reduced or lost. Consequently, the surface pressure of the contact section between the inner surface of both of these elastic deformation sections 36 and the outer circumferential surface of the lower section of the inner column 12b, and surface pressure of the contact section between the outer circumferential surface of the upper section of this inner column 12b and the inner circumferential surface of the upper section of the outer column 11b, are reduced or lost.

In short, by operating the adjustment lever 15a in the predetermined direction, the frictional engagement between the inner side surface of both of the supporting plate sections 23a and the outer side surface of both of the side plate sections 31, the frictional engagement between the inner surface of both of the elastic deformation sections 36 and the outer circumferential surface of the lower section of the inner column 12b, and the frictional engagement between the outer circumferential surface of the upper section of this inner column 12b and the inner circumferential surface of the upper section of the outer column 11b, are all released. Consequently, this outer column 11b is slid in the axial direction with respect to the inner column 12b while the front-rear position of the steering wheel is adjusted. This adjustment is possible within a range where the adjustment bolt 17a can be displaced within both of the long holes 30.

Having adjusted the steering wheel to a desired position, the adjustment lever 15a is operated in a direction opposite to the predetermined direction to thereby rotate the adjustment bolt 17a in the reverse direction. Thereby, the distance between the non-rotating cam plate 25 and the thrust bearing 26 is reduced, and the inner side surface of both of the supporting plate sections 23a and the outer side surface of both of the side plate sections 31 are friction-engaged. Moreover, in this state, as shown in FIG. 3(B), the major axis direction of the sectionally non-circular portion of the axially intermediate section of the adjustment bolt 17a does not match with the axial direction of the outer column 11b. As a result, the pressing member 37 is pushed upward, and the force of this pressing member 37 pressing both of the elastic deformation sections 36 increases. Consequently, the surface pressure of the contact section between the inner surface of both of these elastic deformation sections 36 and the outer circumferential surface of the lower section of the inner column 12b, and the surface pressure of the contact section between the outer circumferential surface of the upper section of this inner column 12b and the inner circumferential surface of the upper section of the outer column 11b, are increased.

In short, by operating the adjustment lever 15a in the direction opposite to the predetermined direction, the inner side surface of both of the supporting plate sections 23a and the outer side surface of both of the side plate sections 31, the inner surface of both of the elastic deformation sections 36 and the outer circumferential surface of the lower section of the inner column 12b, and the outer circumferential surface of the upper section of this inner column 12b and the inner circumferential surface of the upper section of the outer column 11b, are all friction-engaged. In this state, this outer column 11b does not slide with respect to the inner column 12b in the axial direction, and the front-rear position of the steering wheel is fixed in a post-adjustment position. In the case of the present example, in a state where the front-rear position of the steering wheel is fixed in this way, it is possible to increase the frictional force that acts between the portion that is displaced in the front-rear direction in response to this front-rear position adjustment (displacement portion), and the portion that is not displaced regardless of the front-rear position adjustment (non-displacement portion). That is to say, in the case of the structure of the present example, compared to the case of the conventional structure disclosed in Patent Document 1 mentioned above, it is possible to increase the number of frictional engagement sections that contribute to the front-rear position fixation of the steering wheel (increase the area sum of frictional engagement sections) while the strength and rigidity of the steering wheel for front-rear position fixation can be made high. This point is described below, with reference to FIG. 5 and FIG. 6.

Figure 5A:
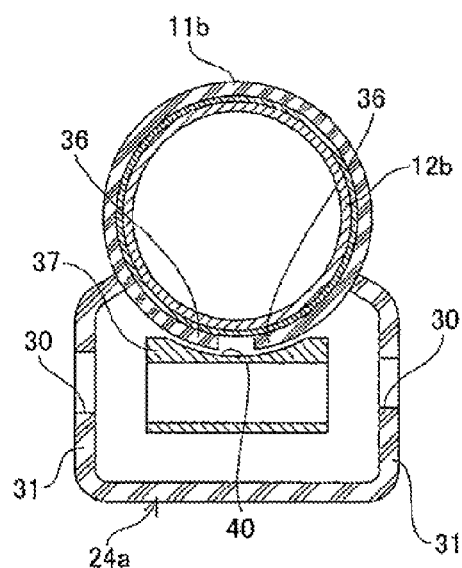
FIG. 5a includes partly omitted sectional views of a structure of the first embodiment seen from the same direction as FIG. 1, showing a state where the front-rear position of the steering wheel is adjusted, and FIG. 5b includes partly omitted sectional views of a structure of the first embodiment seen from the same direction as FIG. 1, showing a state where it is fixed in a post-adjustment position.
Figure 5B:
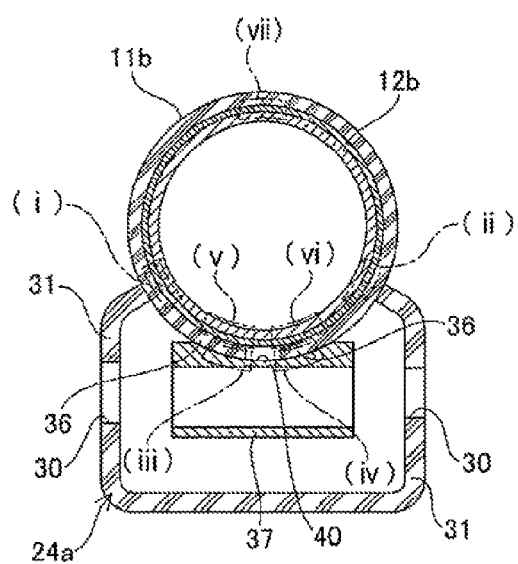

Among these FIG. 5 and FIG. 6, FIG. 5 includes sectional views showing an essential point of the structure of the present example, and FIG. 6 includes sectional views showing an essential point of the structure disclosed in Patent Document 1. Moreover, each (A) drawing shows a state where the front-rear position of the steering wheel is adjusted, and each (B) drawing shows a state where this front-rear position is fixed. In the case of the structure of the present example, as shown from (A) to (B) in FIG. 5, the nipped bracket 24a is nipped from widthwise direction both sides and the pair of left/right elastic deformation sections 36 are pressed upward by the pressing member 37, and consequently the displacement portion and the non-displacement portion are friction engaged in seven positions (i) to (vii) shown with alternate long and short dash lines in FIG. 5(B). These seven positions (i) to (vii) are respectively brought into frictional engagement by the following mechanisms.

As a result of the reduction in the distance between the non-rotating cam plate 25 and the thrust bearing 26, if the nipped bracket 24a is firmly pressed from the widthwise direction both sides, the clearance between the upper end sections of this nipped bracket 24a tends to be reduced. Then the upper end section of this nipped bracket 24a firmly presses the outer circumferential surface of the outer column 11b, and consequently the inner circumferential surface of this outer column 11b and the outer circumferential surface of the inner column 12b are brought into frictional engagement in two positions (i) and (ii) in FIG. 5(B). Moreover, as the pressing member 37 is raised, the contact section between the concave section 40 of this pressing member 37 and the lower surface of both of the elastic deformation sections 36, in two positions (iii) and (iv) in FIG. 5(B), and the contact section between the upper surface of both of these elastic deformation sections 36 and the lower section of the outer circumferential surface of the inner column 12b, in two positions (v) and (vi) in FIG. 5(B), are brought into frictional engagement. Furthermore, the contact section between the upper section of the inner circumferential surface of the outer column 11b and the upper section of the outer circumferential surface of the inner column 12b, in a position (vii) in FIG. 5(B), is also brought into frictional engagement. All of these seven positions (i) to (vii) are portions in which a displacement portion and a non-displacement portion are in frictional engagement, and consequently the restraining force based on the entire friction becomes significant, and the strength and rigidity for fixing the front-rear position of the steering wheel in the post-adjustment position, are sufficiently high.

Figure 6A:
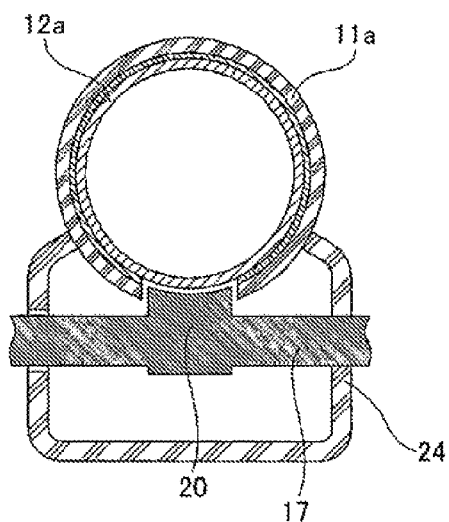
FIG. 6a shows a conventional structure where the front-rear position of the steering wheel is adjusted.
Figure 6B:
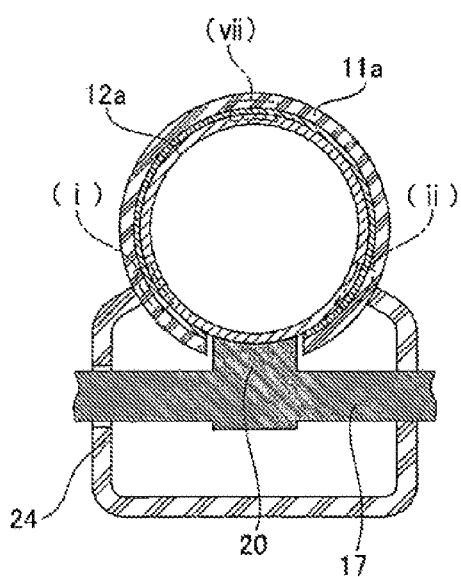
FIG. 6b shows a conventional structure where the steering wheel is fixed in a post-adjustment position.

On the other hand, in the case of the conventional structure disclosed in Patent Document 1, even in a case where it is shifted from a state of adjusting the front-rear position of the steering wheel shown in FIG. 6(A) to a state of fixing this front-rear position shown in FIG. 6(B), the displacement portion and the non-displacement portion are only brought to frictional engagement in three positions (i), (ii), and (vii) in this FIG. 6(B). The engagement section between the tip end section of a cam member 20 and the outer circumferential surface of an inner column 12a is just an engagement section between non-displacement portions, and do not contribute to fixation of the front-rear position of the steering wheel in a post-adjustment position. Moreover, when comparing the portions (i), (ii), and (vii) in FIG. 5(B) with the portions (i), (ii), and (vii) in FIG. 6(B), the frictional area of the each portion is substantially the same. Moreover, as long as the torque given by each adjustment lever 15 (15a) to each adjustment bolt 17 (17a) is the same, the surface pressure of the frictional engagement sections is substantially the same. In short, in the case of the structure of the present example, the strength and rigidity for fixing the front-rear position of the steering wheel in a post-adjustment position become higher by as much as the increment in the frictional area for the four portions (iii) to (vi) in FIG. 6(B) compared to the conventional structure. Therefore, even in a case where requirement in performance of the telescopic steering column apparatus becomes higher and the strength and rigidity for fixing the front-rear position of the steering wheel need to be made higher, this requirement can be sufficiently met.

Second Embodiment

Figure 7A:
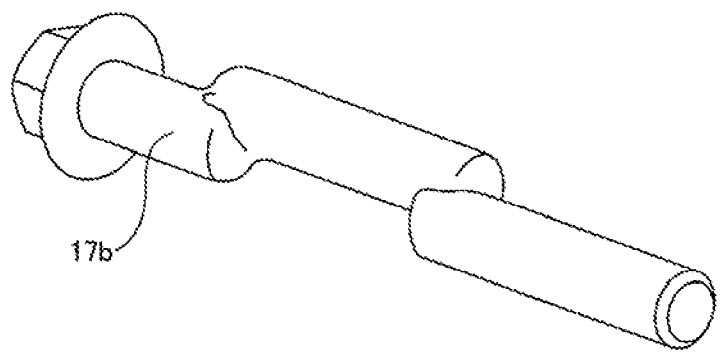
FIG. 7a shows a second embodiment and includes a perspective view of an adjustment bolt.
Figure 7B:
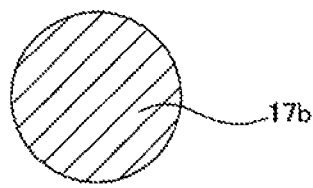
FIG. 7b shows the second embodiment and includes a sectional view of an axially intermediate section of this adjustment bolt.
Figure 7C:
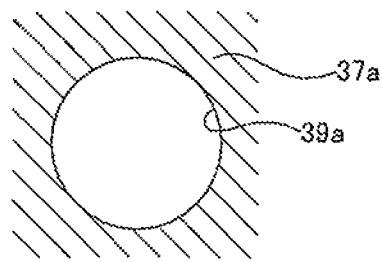
FIG. 7c shows the second embodiment and includes a sectional view of an insertion hole of a pressing member.

FIG. 7 shows a second embodiment of the present invention, corresponding to the first aspect. In the case of the present example, the shape of an adjustment bolt 17b is of a crank type. That is to say, the axially intermediate section of this adjustment bolt 17b is decentered with respect to both end sections thereof, and it is capable, in this portion, of pressing a pressing member 37a against the outer circumferential surface of the outer column 11b (refer to FIG. 1 to FIG. 3). The sectional shape of the axially intermediate section of the adjustment bolt 17b is of a circular shape as shown in FIG. 7(B), and the sectional shape of an insertion hole 39a formed in the pressing member 37a is also of a circular shape as shown in FIG. 7(C). According to such a structure of the present example, an amount of raising and lowering of the pressing member 37a can be easily ensured while ensuring the strength and rigidity of the adjustment bolt 17b.

The configuration and effect of other portions are similar to those in the first embodiment described above, and illustration and description of equivalent portions are therefore omitted.

Third Embodiment

Figure 8:
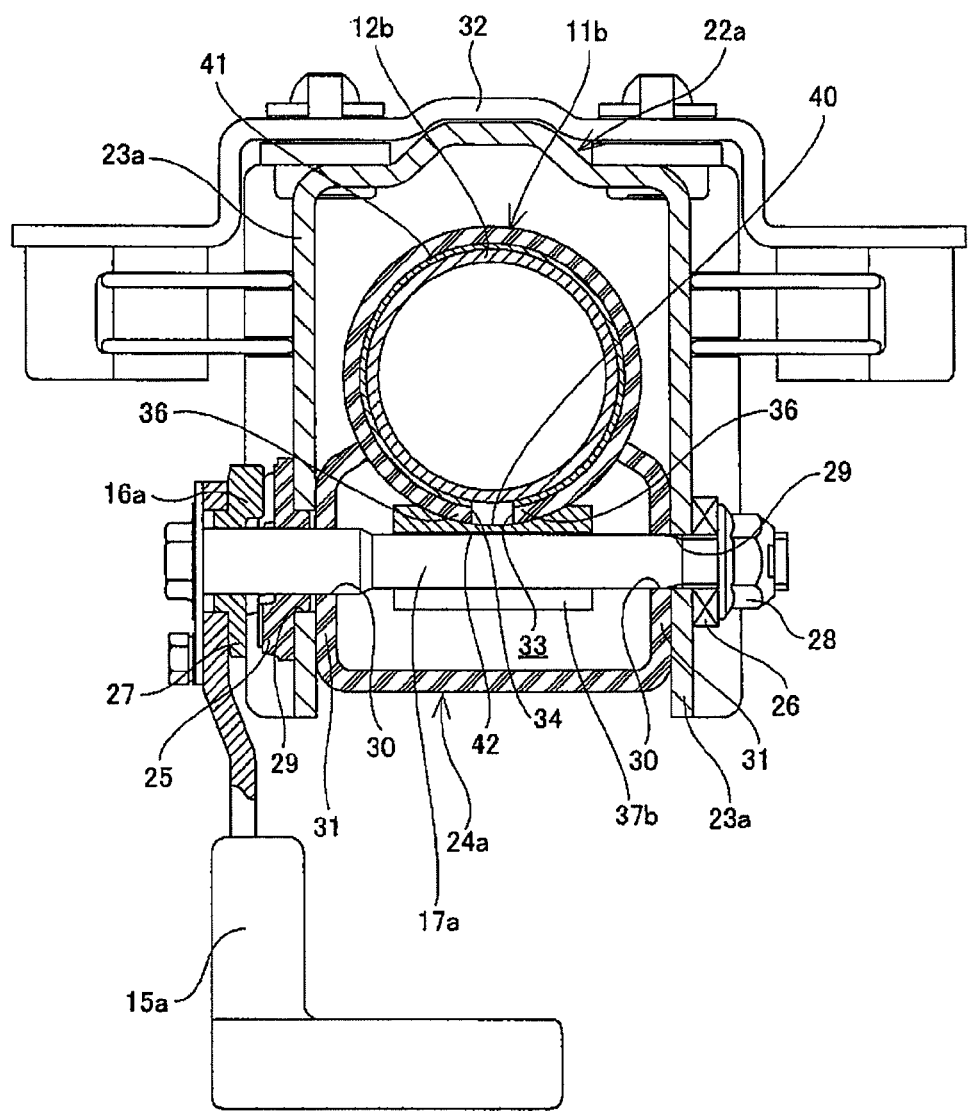
FIG. 8 is a drawing similar to FIG. 1, showing a third embodiment of the present invention.

FIG. 8 and FIG. 9 show a third embodiment of the present invention, corresponding to the first aspect. In the case of the present example, an engagement concave section 42 is formed in the lower surface of the pressing member 37b, and the axially intermediate section of the adjustment bolt 17a is engaged within this engagement concave section 42. In other words, the pressing member 37b is mounted, in a saddle shape, on the axially intermediate section of this adjustment bolt 17a. Such a structure of the present example allows low cost manufacturing of this pressing member 37b by means of forging processing or the like. Moreover, workability of assembling this pressing member 37b with the adjustment bolt 17a becomes better. Thus, it is possible to suppress an increase in cost of the telescopic steering column apparatus. In the present example, the adjustment bolt 17b of the second example may be applied instead of the adjustment bolt 17a.

The configuration and effect of other portions are similar to those in the first embodiment or the second embodiment described above, and illustration and description of equivalent portions are therefore omitted.

Fourth Embodiment

Figure 10A:
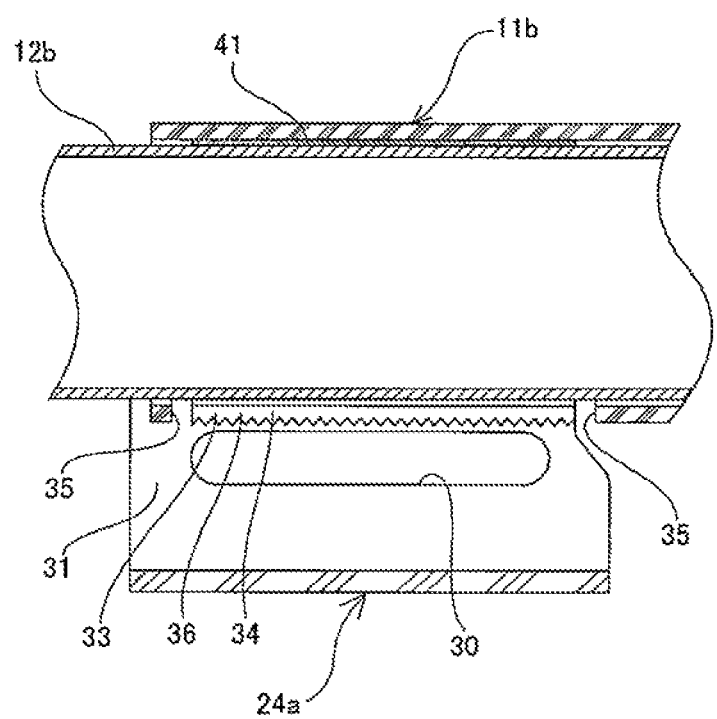
FIG. 10a shows a fourth embodiment of the present invention, including a sectional view showing a fitting section of both outer and inner columns.
Figure 10B:
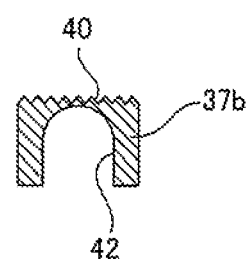
FIG. 10b shows a fourth embodiment of the present invention, including a sectional view of the pressing member.

FIG. 10 shows a fourth embodiment of the present invention, corresponding to the first aspect. In the case of the present example, the lower surface of the pair of the elastic deformation section 36 provided on the lower side of the front end section of the outer column 11b, and the bottom surface of the concave section 40 of the pressing member 37b, are made rough surfaces. In the example shown in the drawing, these respective surfaces are of a washboard shape in which fine V shaped concave sections and V shaped convex sections are alternately arranged in the front-rear direction. With such a configuration, the frictional force that acts between the lower surface of both of the elastic deformation sections 36 and the bottom surface of the concave section 40 of the pressing member 37b, is increased (furthermore, they are mechanically concave-convex engaged), to thereby increase the force of fixing the front-rear position of the steering wheel. As for surface roughening, both of the lower surface of both of the elastic deformation sections 36 and the bottom surface of the concave section 40, or only one of the surfaces may be roughened. Moreover, the direction of roughness is not limited as long as the frictional coefficient can be increased. However, if both of the surfaces are mechanically concave-convex engaged with each other in a washboard shape and are combined with the above mentioned structure shown in FIG. 7, engagement and disengagement of this concave-convex engagement can be reliably performed, and workability of adjustment and fixation of the front-rear position of the steering wheel can be improved.

The configuration and effect of other portions are similar to those in the first to second embodiment or the third embodiment described above, and illustration and description of equivalent portions are therefore omitted.

Fifth Embodiment

Figure 11:
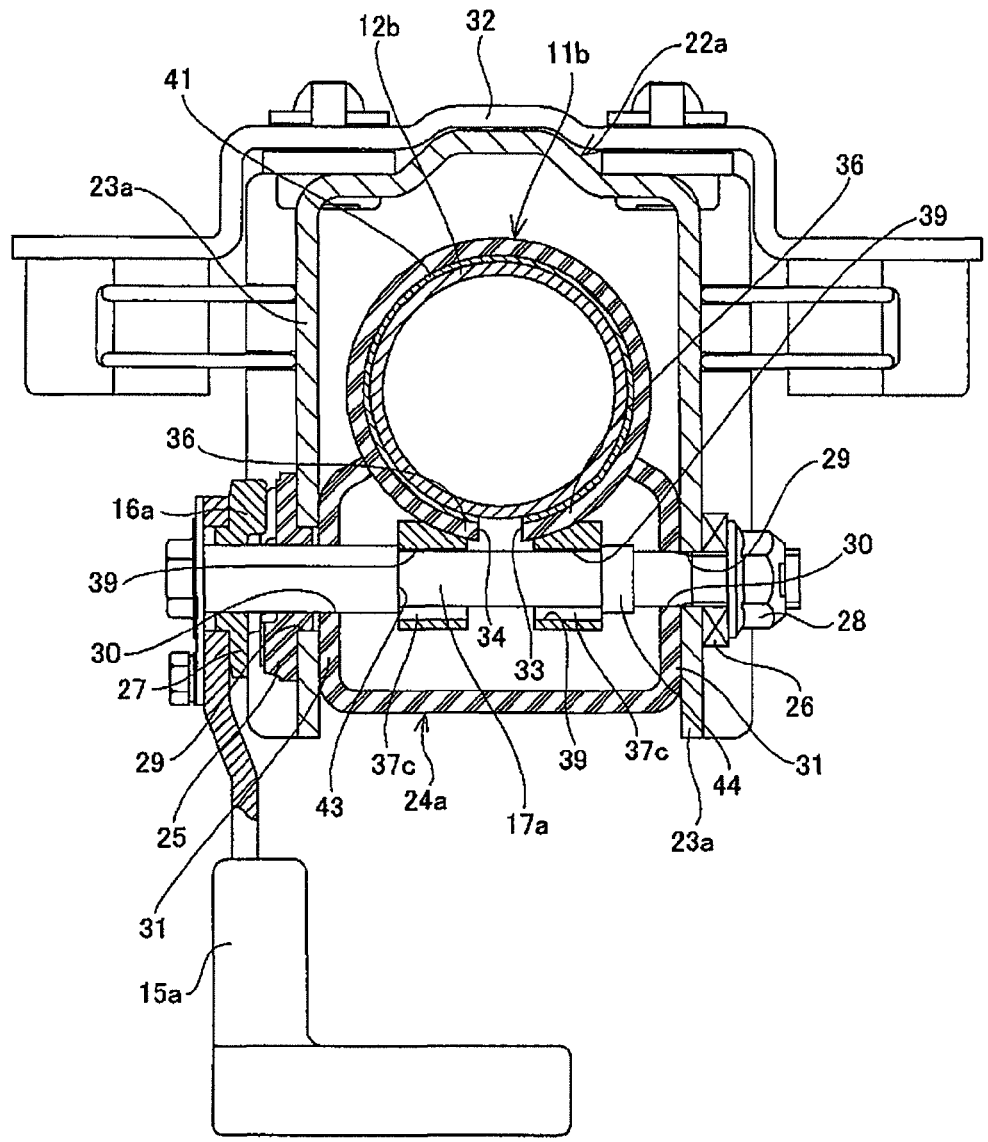
FIG. 11 is a drawing similar to FIG. 1, showing a fifth embodiment of the present invention.

FIG. 11 shows a fifth embodiment of the present invention, corresponding to the first aspect. In the case of the present example, in two positions on the adjustment bolt 17a that are distanced from each other in the axial direction, there are provided a pair of pressing members 37c in a state of preventing displacement in a direction of moving away from each other. Consequently, a step section 43 is formed in a portion of the intermediate section close to the base end of the adjustment bolt 17a (to the left in FIG. 11), and a large diameter section 44 is provided in a portion of the intermediate section close to the tip end (to the right in FIG. 11). The peripheral portion of the insertion hole 39 on the outer side surface of both of the pressing members 37c is engaged with the step section 43 or the large diameter section 44. A portion that comes in contact with the elastic deformation section 36 of the outer column 11b on the inner side of the upper end section of both of the pressing members 37c, is of a concave surface in a partly cylindrical shape that corresponds to the shape of the outer circumferential surface of this outer column 11b. The large diameter section 44 may be formed integrally with the adjustment bolt 17a in a case where the outer diameter thereof is smaller than or equal to the diameter of the inscribed circle of the insertion hole 39 of both of the pressing members 37c. On the other hand, in a case where the outer diameter is greater than the diameter of the inscribed circle, after both of the pressing members 37c have been externally fitted on the adjustment bolt 17a, it is formed by externally fitting and fixing a sleeve on this adjustment bolt 17c by means of shrink fitting or the like.

According to such a structure of the present example, assembly of both of the pressing members 37c is still possible even in a case where the clearance is narrow between the lower end section of the outer circumferential surface of the outer column 11b and the upper surface of the intermediate section of the adjustment bolt 17a. Moreover, the shape of both of the pressing members 37c is simplified, and it is therefore possible to suppress the cost of manufacturing both of these pressing members 37c to a low level. Also in the present example, the adjustment bolt 17b of the second example may be applied instead of the adjustment bolt 17a.

The configuration and effect of other portions are similar to those in the first to third embodiment or the fourth embodiment described above, and illustration and description of equivalent portions are therefore omitted.

Sixth Embodiment

Figure 12:
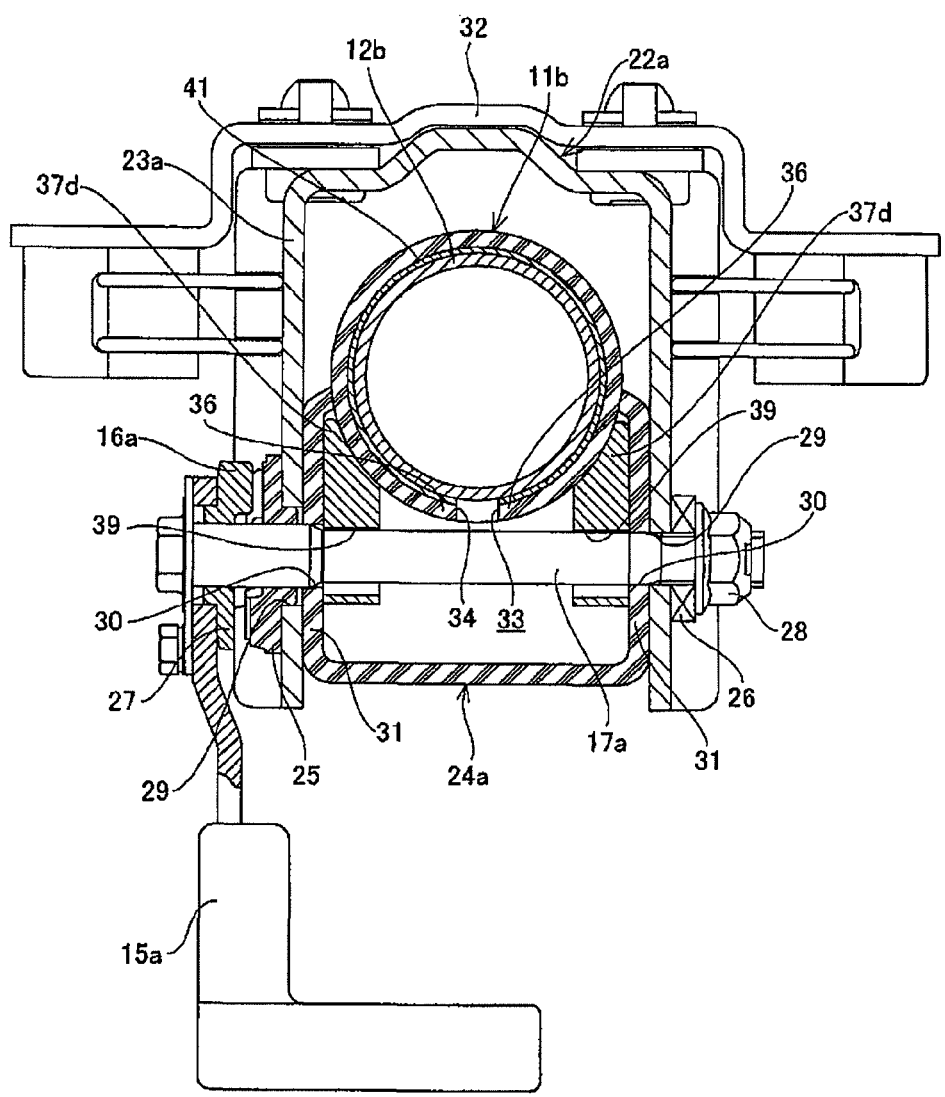
FIG. 12 is a drawing similar to FIG. 1, showing a sixth embodiment of the present invention.

FIG. 12 shows a sixth embodiment of the present invention, corresponding to the first aspect. In the case of the present example, side surfaces of a pair of pressing members 37d on mutually opposite sides, are respectively in contact with the inner side surface of the pair of the side plate sections 31 that constitute the nipped bracket 34a. In such a case of the present example, if both of the pressing members 37d are pressed against both of the side portions of the lower surface of the outer column 11b as the adjustment bolt 17a is rotated, due to a reactive force generated in response to this pressing, the outer side surfaces of both of the pressing members 37d are pressed against the inner side surfaces of both of the side plate sections 31. Both of these pressing members 37d are non-displacement portions and both of these side plate sections 31 are displacement portions, and therefore, the frictional force that acts on a contact section between the outer side surface of both of these pressing members 37d and the inner side surface of both of the side plate sections 31a, also serves as a force of fixing the front-rear position of the steering wheel. Consequently, in the case of the present example, the strength and rigidity for fixing this front-rear position of the steering wheel can be made even higher. Also in the present example, the adjustment bolt 17b of the second example may be applied instead of the adjustment bolt 17a.

The configuration and effect of other portions are similar to those in the fifth embodiment described above, and illustration and description of equivalent portions is therefore omitted.

Seventh Embodiment

Figure 13:
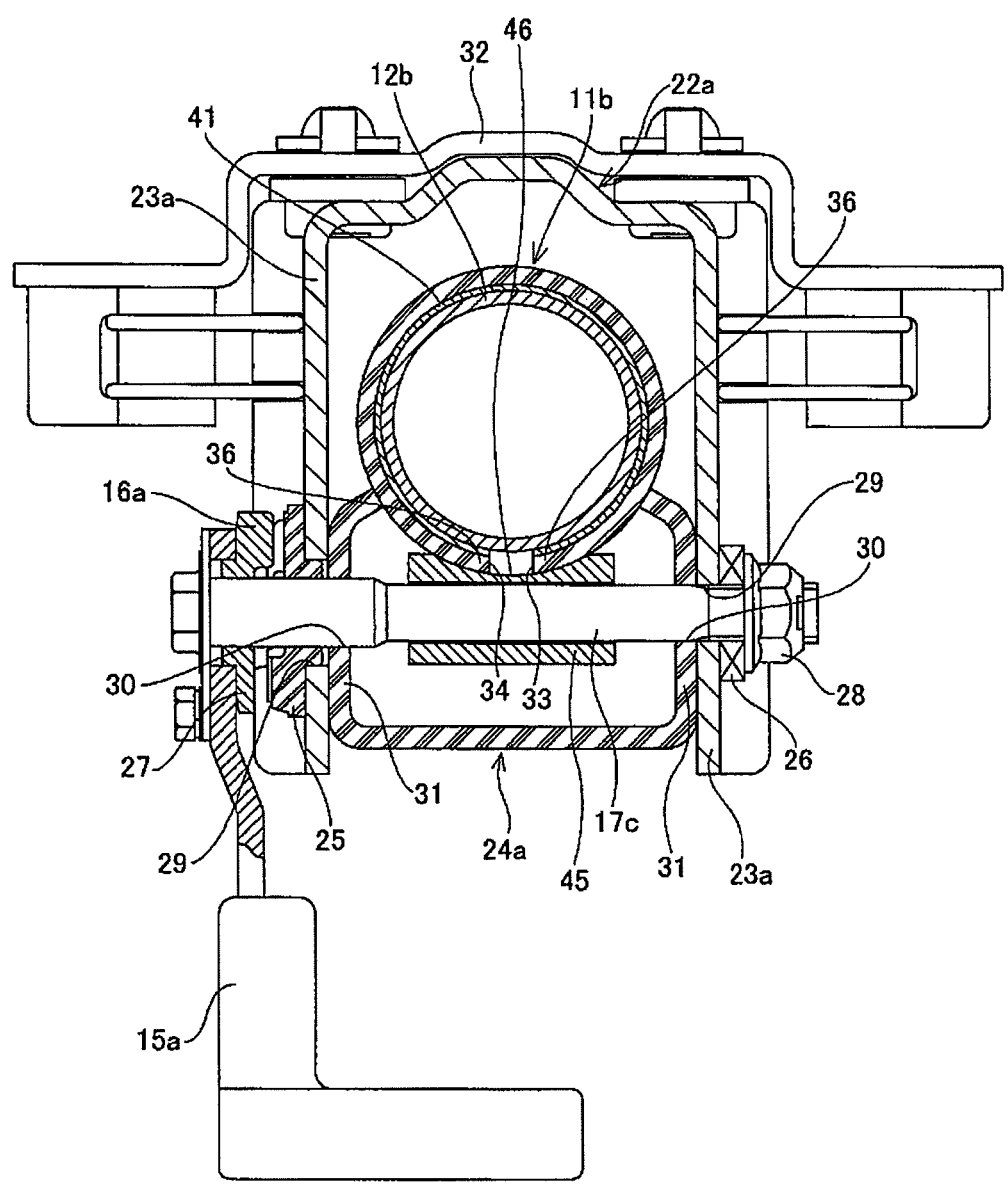
FIG. 13 is a drawing similar to FIG. 1, showing a seventh embodiment of the present invention.

FIG. 13 and FIG. 14 show a seventh embodiment of the present invention, corresponding to a second aspect. In the case of the present example, the axially intermediate section of the adjustment bolt 17c, with respect to both of the side portions thereof, is not partially decentered. Moreover a cam member 45, which serves as a pressing member, is externally fitted and fixed on this axially intermediate section by means of serration engagement or the like, so that this cam member 45 rotates together with the adjustment bolt 17c. This cam member 45 has an egg shape when seen in the axial direction of this adjustment bolt 17c, and provided with an arc-shaped concave section 46 formed on the portion in the axially center section thereof that opposes to the lower end section of the outer circumferential surface of the outer column 11b, in which the center section thereof is deep and it gradually becomes shallower as it gets closer to both of the end sections. Moreover, the cam member 45 is fixed in a direction in which it rises toward the lower end section of the outer circumferential surface of the outer column 11b in a case where the clearance between the non-rotating cam plate 25 and the thrust bearing 26 becomes narrower based on an operation of the adjustment lever 15a.

In the case of such a telescopic steering column apparatus of the present example, if the adjustment lever 15a is operated in a predetermined direction in order to adjust the front-rear position of the steering wheel, the cam member 45 moves away from the lower end section of the outer circumferential surface of the outer column 11b as shown in FIG. 14(A). On the other hand, if the adjustment lever 15a is operated in a direction opposite to the above predetermined direction in order to fix the front-rear position of the steering wheel in a post-adjustment position, the cam member 45 presses the lower end section of the outer circumferential surface of the outer column 11b upward as shown in FIG. 14(B). As a result, as with the case of the first embodiment described above, it is possible, with a large force, to fix the front-rear position of the steering wheel in a post-adjustment position.

Except for that the cam member 45 serves as a pressing member and accordingly the adjustment bolt 17c employs a structure in which the axially intermediate section thereof is not decentered, the configuration and effect are similar to those in the first embodiment described above, and overlapping descriptions are therefore omitted.

Eighth Embodiment

Figure 15:
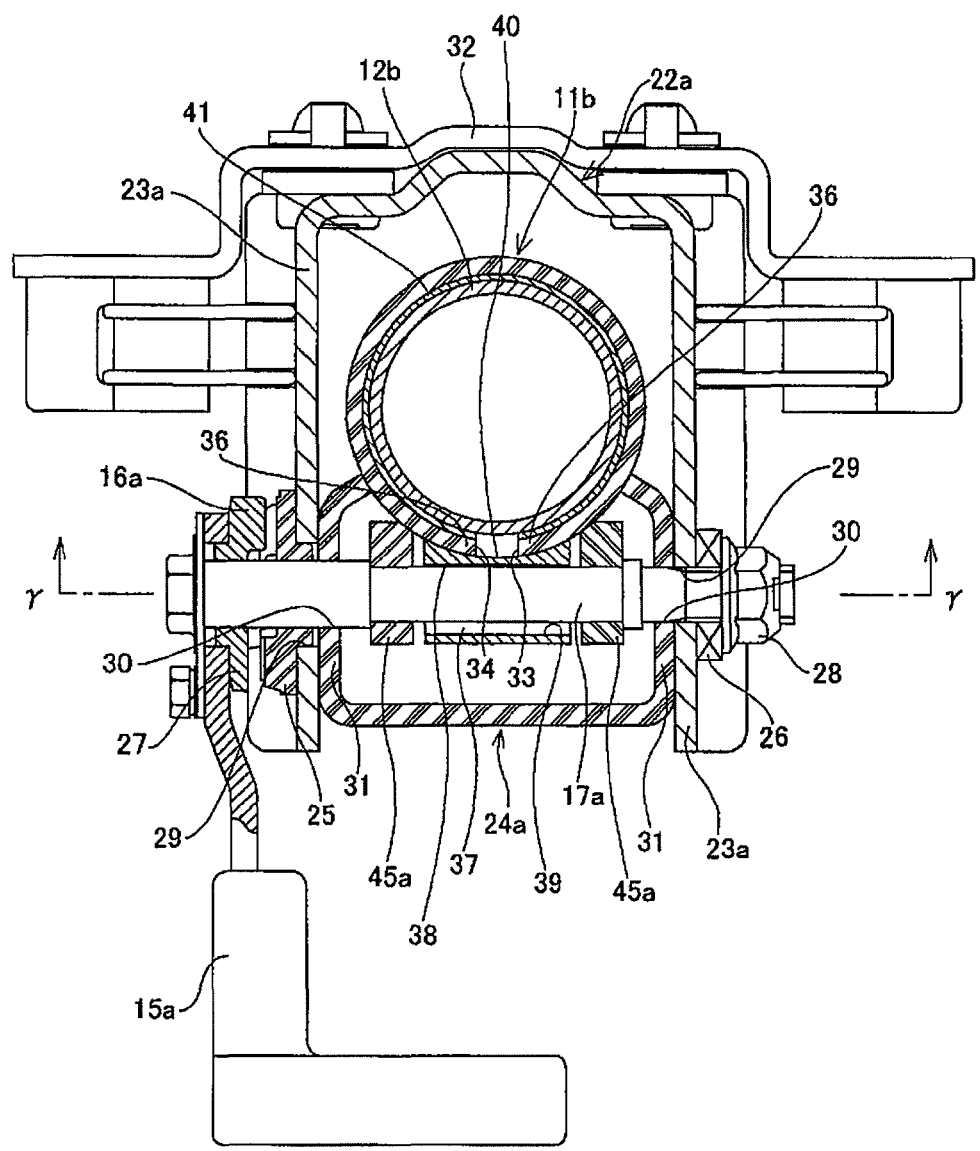
FIG. 15 is a drawing similar to FIG. 1, showing an eighth embodiment of the present invention.
Figure 16:
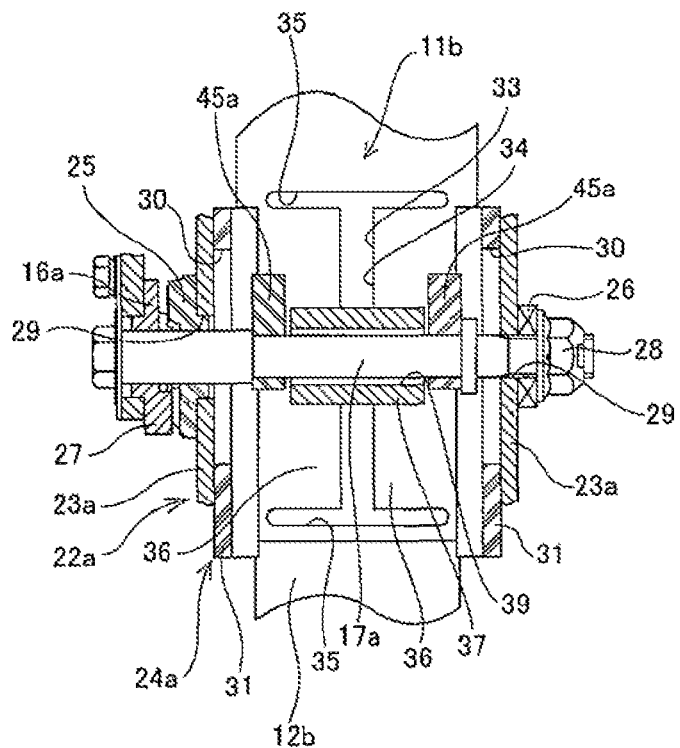
FIG. 16 is a sectional view taken along the line γ-γ of FIG. 15, showing the eighth embodiment.
Figure 17A:
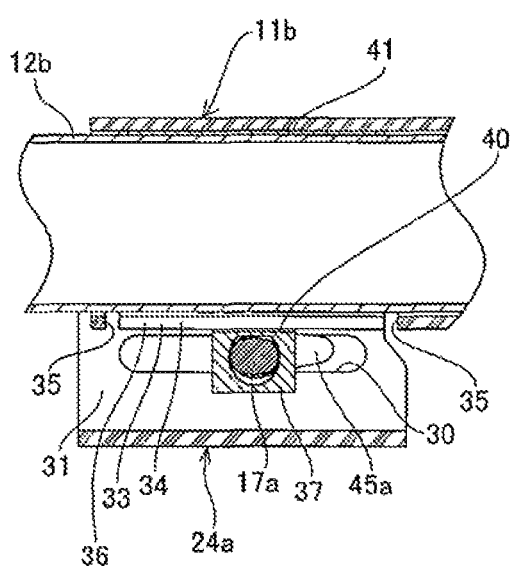
FIG. 17a shows the eighth embodiment and includes a sectional view of FIG. 16 where the front-rear position of a steering wheel is adjusted.
Figure 17B:
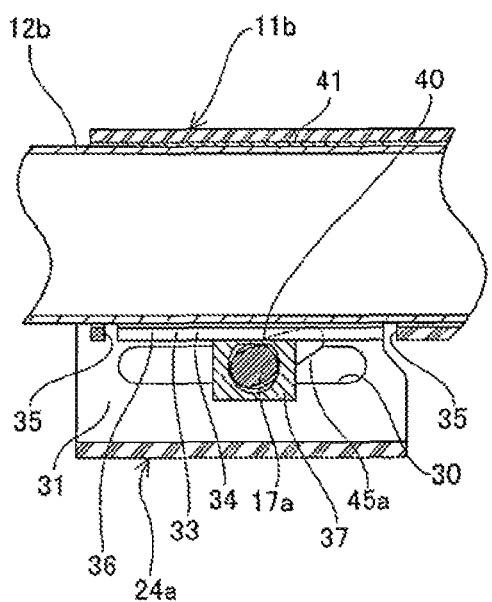
FIG. 17b shows the eighth embodiment and includes a sectional view of FIG. 16 where the front-rear position of a steering wheel is fixed in a post-adjustment position.

FIG. 15 to FIG. 17 show an eighth embodiment of the present invention, corresponding to the second aspect. In the case of the present example, as with the case of the first embodiment described above, the adjustment bolt 17a, the axially intermediate section of which is of a non-column shape, is used as shown in FIG. 4(A) and FIG. 4(B). Moreover, on the intermediate section of this non-column shaped portion except for both of the end sections thereof, there is loosely externally fitted the pressing member 37 similar to that in the case of the first embodiment. Furthermore, in the case of the present example, on both of the end sections of the non-column shaped portion, there are externally fitted a pair of cam members 45a. Both of these cam members 45a have base end sections thereof respectively fitted externally on the non-column shaped portion, so as to rotate in synchronization with the adjustment bolt 17a. The mutually opposing side surfaces of both of the cam members 45a and both of the end surfaces of the pressing member 37 are not to be in firm contact with each other, so that movement of this pressing member 37 will not be prevented by both of the cam members 45a. Moreover, the portion on the tip end section of both of these cam members 45a that opposes to the outer circumferential surface of the outer column 11b, is of a partly cylindrical concave-curved surface that corresponds to the shape of this outer circumferential surface.

In the case of the present example configured as described above, if, with an operation of the adjustment lever 15a, the adjustment bolt 17*a* is rotated in a direction of reducing the distance between the non-rotating cam plate 25 and the thrust bearing 26, as with the case of the first embodiment, the pressing member 37 presses the pair of the elastic deformation sections 36 formed on the lower end section of the outer column 11*b* upward. At the same time, the tip end sections of both of the cam members 45*a* also press both of these elastic deformation sections 36 upward. As a result, a force of preventing axially relative displacement between the outer column 11*b* and the inner column 12*b* is further increased, and thereby the strength and rigidity for retaining the front-rear position of the steering wheel in a post-adjustment position can be made even higher.

In the case of the present example, except for that both of the cam members 45*a* are provided in addition to the pressing member 37, the configuration and effect are similar to those in the first embodiment. Moreover, except for that the number of the cam members 45*a* is increased to two and accordingly the position in which the tip end section of each of these members 45 presses both of the elastic deformation sections 36 is changed, the point in that both of the cam members 45*a* press both of the elastic deformation sections 36 upward, is substantially similar to that in the case of the seventh embodiment described above. Therefore, description of portions similar to those in the first example and the seventh embodiment are omitted.

Ninth Embodiment

Figure 18:
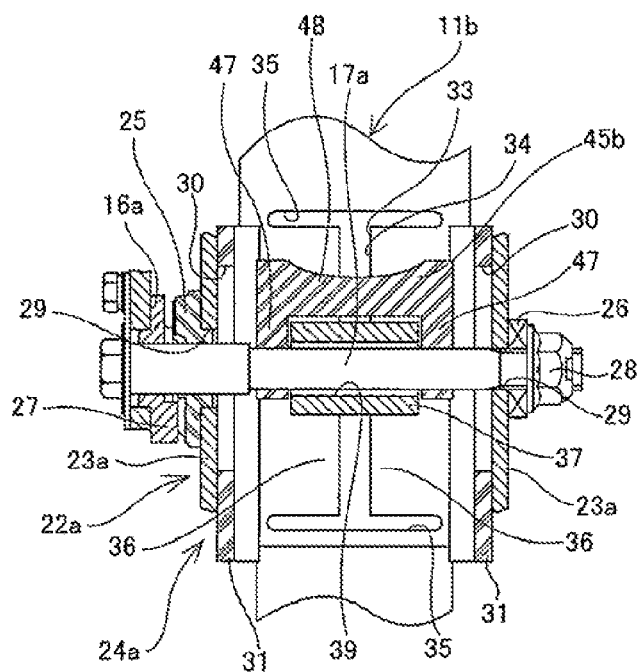
FIG. 18 is a drawing similar to FIG. 2, showing a ninth embodiment of the present invention.
Figure 19A:
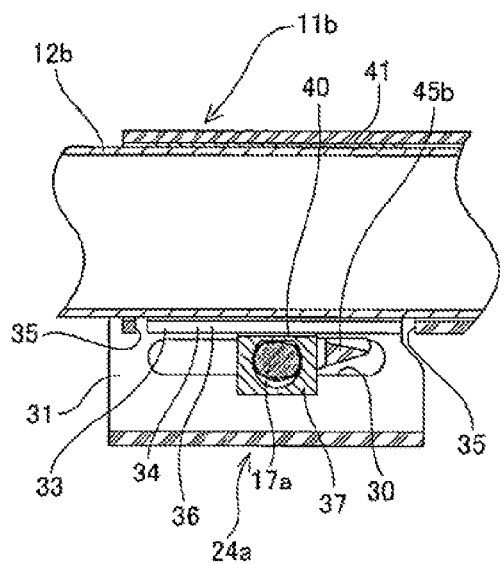
FIG. 19 is a drawing similar to FIG. 3, showing the ninth embodiment.
Figure 19B:
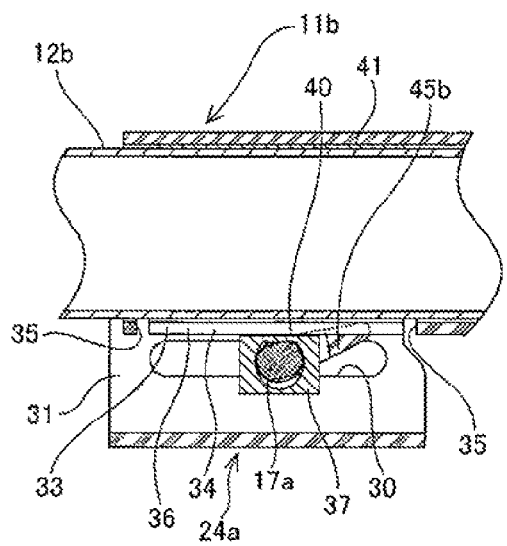

FIG. 18 and FIG. 19 show a ninth embodiment of the present invention, corresponding to the second aspect. In the case of the present example, there is used an integrated type cam member 45*b* in which a pair of cam pieces 47 are joint fixed by a joining section 48. Moreover, such an integrated type cam member 45*b* is arranged so as to straddle the pressing member 37 loosely externally fitted on the intermediate section of the adjustment bolt 17*a*, and the base end section of both of the cam pieces 47 are externally fitted on both of the side portions of this pressing member 37 of the adjustment bolt 17*a*. Also, the tip end section of both of the cam pieces 47 or the tip end periphery of the joining section 48 presses the pair of elastic deformation sections 36 formed in the lower end section of the outer column 11*b* upward. In the case of such a structure of the present example, the structure that is required in the case of the eighth embodiment described above and that serves to prevent the pair of cam members 45*a* from displacing in a direction of moving away from each other, is not required and it is consequently possible to simplify the assembly operation.

The structure and effect of other portions are similar to those in the eighth embodiment described above, and overlapping illustration and description are therefore omitted.

Tenth Embodiment

Figure 20:
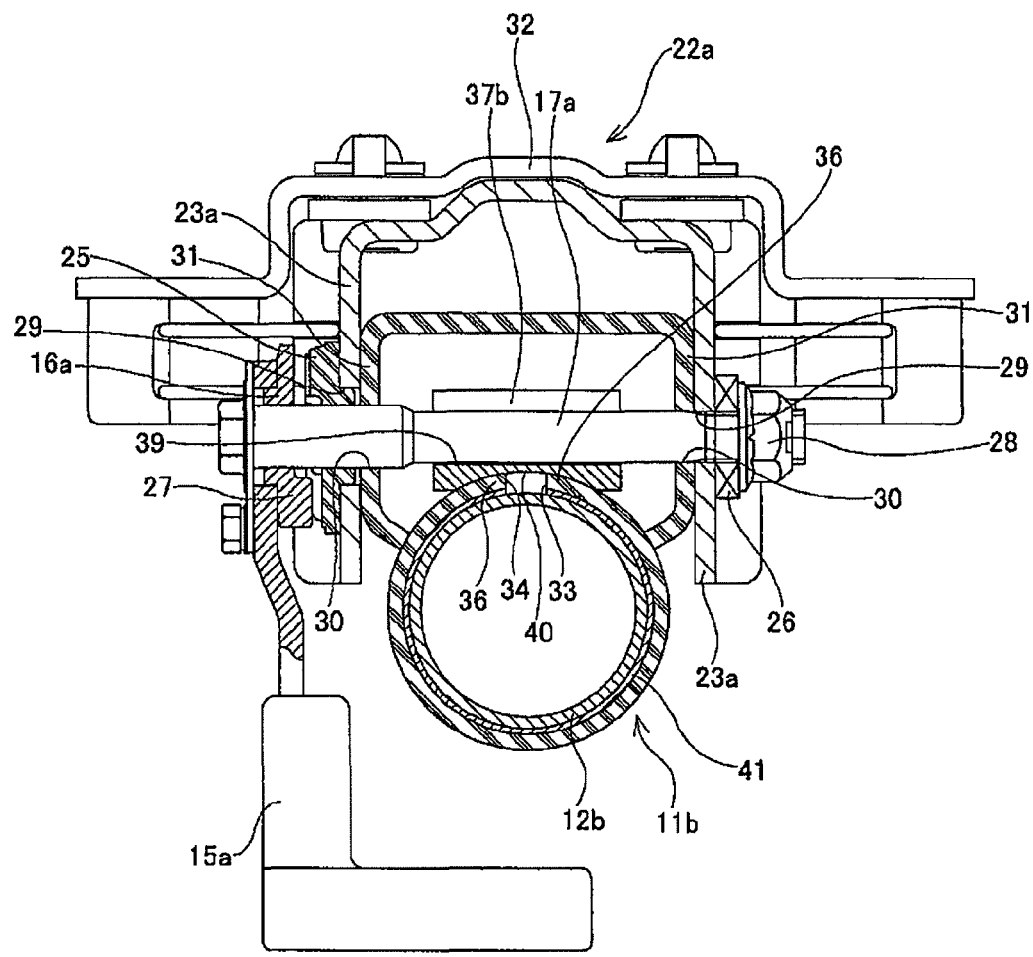
FIG. 20a shows the eighth embodiment and includes a sectional view of FIG. 19 where the front-rear position of a steering wheel is adjusted.
FIG. 20b shows the eighth embodiment and includes a sectional view of FIG. 19 where the front-rear position of a steering wheel is fixed in a post-adjustment position.

FIG. 20 shows a tenth embodiment of the present invention, corresponding to the first aspect. In the case of the present example, with respect to the third embodiment shown in FIG. 8 and FIG. 9, the upper-lower positions of the adjustment bolt 17*a* and the pressing member 37*b* are reversed with respect to the outer column 11*b*. That is to say, in the case of the present example, the adjustment bolt 17*a* and pressing member 37*b* are arranged above the front end section of the outer column 11*b*. Accordingly, the slit 33 is formed in the upper section of the front end of this outer column 11*b*. In such a structure of the present example, compared to the third embodiment described above, the degree of freedom is reduced in designing to allow the outer column 11*b* to be installed on the upper side, however, the strength and rigidity for fixing the front-rear position of the steering wheel in a post-adjustment position becomes high instead. This point is described below, with reference to FIG. 21 and FIG. 22.

FIG. 21 includes approximate sectional views of the structure of the present example, and FIG. 22 includes approximate sectional views of the third embodiment described above, respectively showing a state (A) where the front-rear position of the steering wheel can be adjusted and a state (B) where this front-rear position is fixed. In the case of the third embodiment, during the process of fixing the front-rear position of the steering wheel shown in FIG. 22(A) to (B), a pair of the supporting plate sections 23*a* elastically deform in a direction in which the distance therebetween becomes shorter as it gets closer to the lower side. At the lower end section of the nipped bracket 24*a*, the inner side surface of both of these supporting plate sections 23*a* press both side periphery portions of a joining plate section 49 that joins the pair of side plate sections 31. The rigidity of this portion is high, and therefore the degree of pressing force of both of the supporting plate sections 23*a* contributing to a reduction in the diameter of the outer column 11*b*, is reduced.

On the other hand, in the case of the structure of the present example, during the process of fixing the front-rear position of the steering wheel shown in FIG. 21(A) to (B), at the lower end section of the nipped bracket 24*a*, the inner side surface of the pair of the supporting plate sections 23*a* press a portion in the vicinity of an abutting section between the pair of side plate sections 31 and the outer circumferential surface of the outer column 11*b*. This portion has a comparatively low level of rigidity and is abutted against the outer circumferential surface of this outer column 11*b*, and therefore the pressing force of both of the supporting plate sections 23*a* effectively acts in a direction in which the diameter of the outer column 11*b* is reduced. As a result, it is possible to further increase the frictional force that acts between the inner circumferential surface of the front end section of this outer column 11*b* and the outer circumferential surface of the rear end section of the inner column 12*b* (refer to FIG. 20).

The structure and effect of other portions are similar to those in the third embodiment illustrated in FIG. 8 and FIG. 9 except for that the upper-lower direction of some parts is reversed.

Also, as with the present example, the structure, in which the adjustment bolt is arranged above the outer column, is not limited to the structure of the third embodiment described above, and may be applied to the structures of the first, second, fifth to ninth embodiments. However, application thereof to the fourth example illustrated in FIG. 10 is not preferable because engagement between the washboard concave-convex sections cannot be easily released even in a state where the clearance between the non-rotating cam plate 25 and the thrust bearing 26 is expanded.

Eleventh Embodiment

Figure 23:
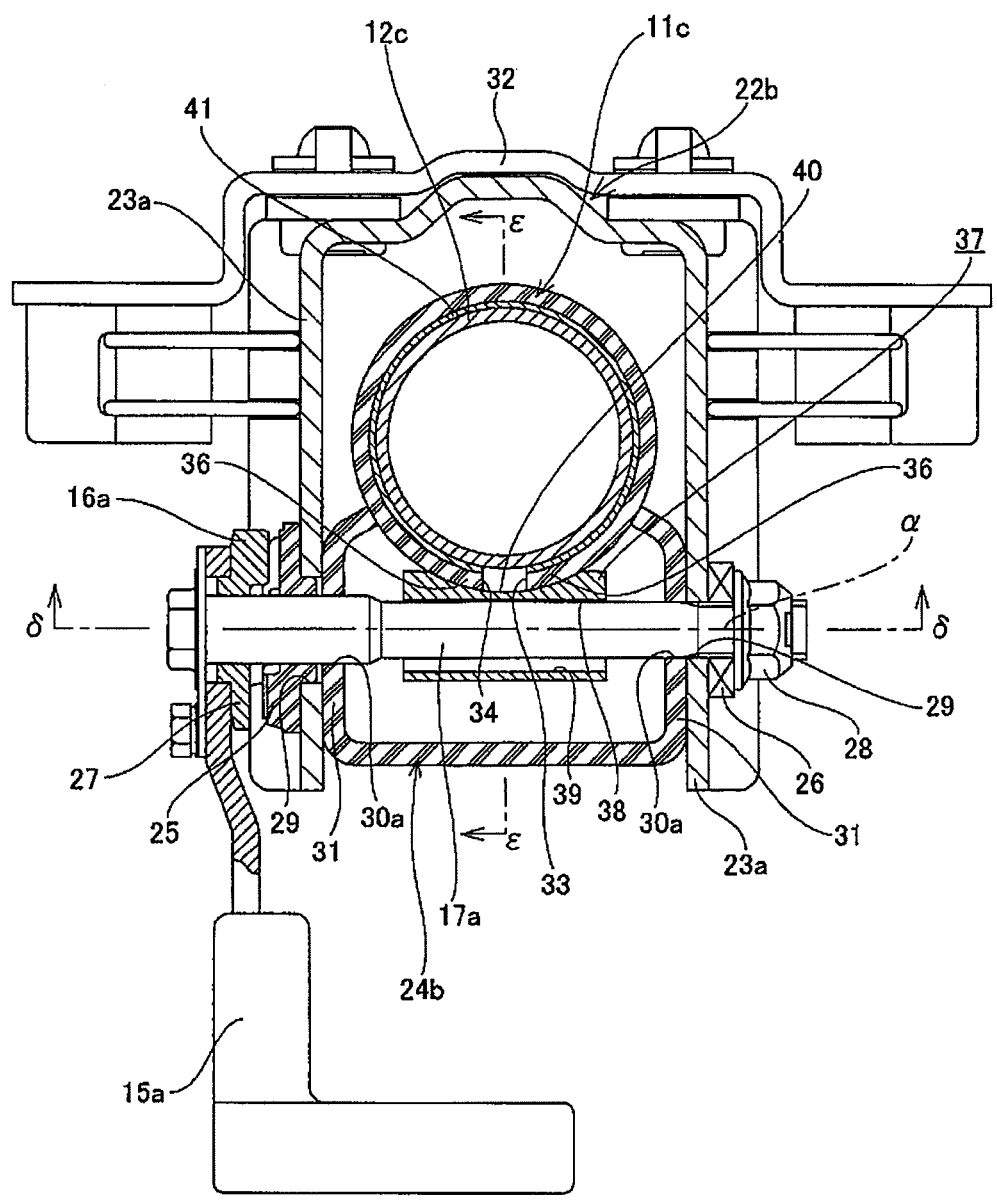
FIG. 23 is a sectional view similar to FIG. 1, showing an eleventh embodiment of the present invention.
Figure 24:
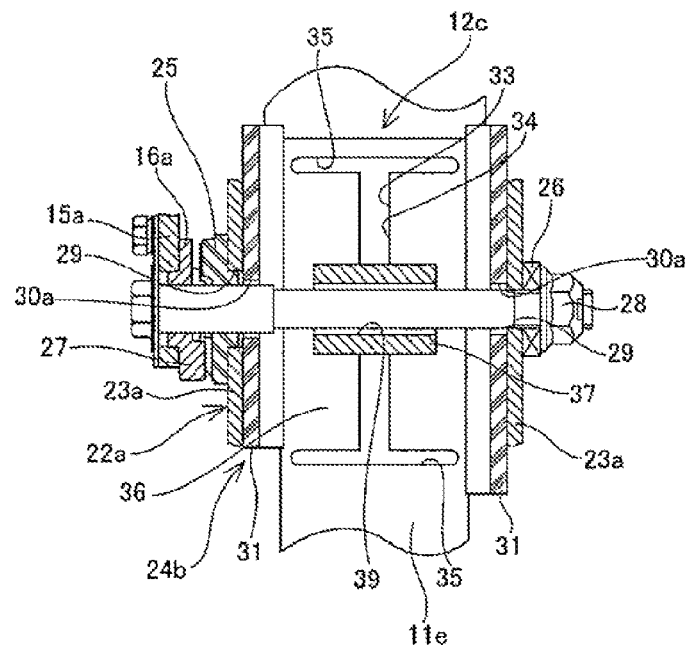
FIG. 24 is a sectional view taken along the line δ-δ of FIG. 23, showing the eleventh example.
Figure 25A:
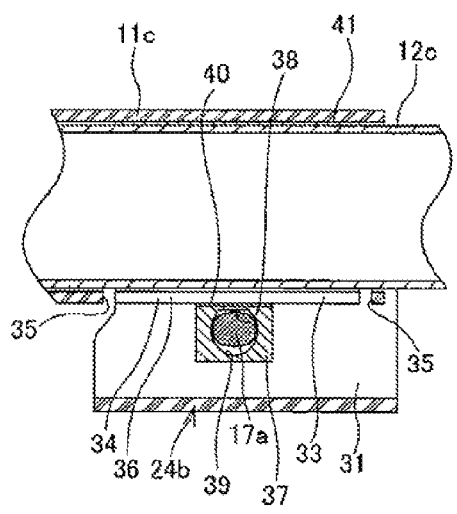
FIG. 25a shows the eleventh embodiment and includes sectional view taken along the line ε-ε of FIG. 23 showing a state where the front-rear position of the steering wheel is adjusted.
Figure 25B:
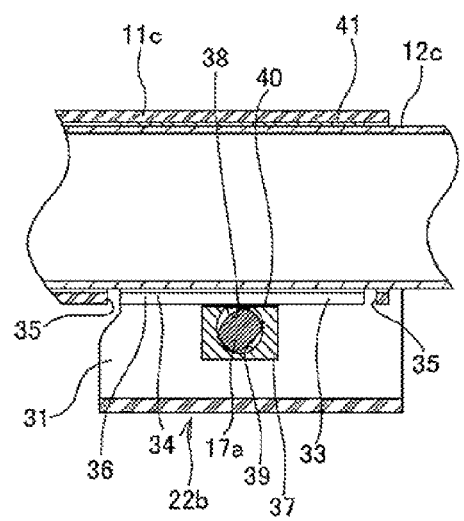
FIG. 25b shows the eleventh embodiment and includes sectional view taken along the line ε-ε of FIG. 23 showing a state where it is fixed in a post-adjustment position.

FIG. 23 to FIG. 25 show an eleventh embodiment of the present invention, corresponding to the first aspect. The present example, being different from the first example, is configured so as to combine, in a telescopic form: a rear end section of an outer column 11*c* that will not be displaced in the axial direction (front-rear direction) even when adjusting the front-rear position of the steering wheel; and a front end section of an inner column 12*c* that is provided on the rear side and that is displaced in the axial direction (front-back direction in FIG. 23, upper-lower direction in FIG. 24, and left-right direction in FIG. 25) when adjusting the front-rear position of the steering wheel, while allowing them to be relatively displaced in the axial direction.

That is to say, in the present example, by changing the amount of insertion of the front end section of the inner column 12c on the rear side made into the rear end section of the outer column 11c on the front side, front-rear movement of the inner column 12c is enabled. The outer column 11 is supported, by a nipping bracket 22c, on a vehicle body in the lower side portion of a dashboard. Moreover, on the rear end section of the outer column 11c, there is weld-fixed a nipped bracket 24c in a state of projecting downward. Thus, in the present example, it is not necessary to enable axial direction position adjustment of the outer column 11c, and therefore the adjustment bolt 17a is inserted: through the circular through holes 29 respectively formed in mutually corresponding positions on the pair of supporting plate sections 23a that constitute the nipping bracket 22c; and through round holes 30a respectively formed in portions of the nipped bracket 24c corresponding to both of these through holes 26. Therefore, in the present example, it is not necessary to provide, in neither the nipping bracket 22c nor the nipped bracket 24c, a long hole that is long in the axial direction of the outer column 11c.

The structure and effect of other portions are similar to those in the first embodiment described above.

[Regarding the Shape of Slit to be Formed in the Outer Column]

In order to bring the inner circumferential surface of the front end section of the outer column 11b and the outer circumferential surface of the rear end section of the inner column 12b into frictional engagement, the shape of the slit to be formed in the front end section of this outer column 11b, may also employ a shape of a second to twelfth examples shown in FIG. 26(A) to FIG. 26(K) in addition to the shape of the first example shown in FIG. 2 described above. Hereunder, there are described shapes and respective characteristics of these second to twelfth examples.

(1) Second Example Shown in FIG. 26(A)

In the case of the present example, of a pair of sub-sections 35a and 35b provided on both of the end sections of the principle section 34 that constitutes a slit 33a, the circumferential length of the sub-section 35a on the front end periphery side of the outer column 11b is greater than the circumferential length of the sub-section 35b on the axially center side of this outer column 11b. Such a structure is effective from the aspect of ensuring the supporting rigidity of this outer column 11b with respect to the inner column 12b in a state where the outer column 11b is displaced backward, namely upward in FIG. 26(A), in order to fix the steering wheel in a rear side position. That is to say, by increasing the circumferential length of the sub-section 35a on the front end periphery side, the rigidity of a pair of elastic deformation sections 36a present on both sides of the principle section 34, becomes smaller as it gets closer to the front side, and consequently it becomes easier to press both of these elastic deformation sections 36a against the outer circumferential surface of the inner column 12b. Therefore, it is possible to increase the contact pressure between both of the elastic deformation sections 36a and the outer circumferential surface of the inner column 12b in a state of having shifted the steering wheel backward where the length of fitting between the rear end section of this inner column 12b and the front end section of the outer column 11b becomes shorter. Moreover, it is possible to ensure the supporting rigidity of the outer column 11b with respect to this inner column 12b. Conversely, the contact pressure becomes lower between both of the elastic deformation sections 36a and the outer circumferential surface of the inner column 12b in a state of having shifted the steering wheel forward where the length of fitting becomes longer. As a result, it is possible, regardless of the front-rear position of the steering wheel, to disallow significant changes in the supporting rigidity of the outer column 11b with respect to the inner column 12b.

(2) Third Example Shown in FIG. 26(B)

In the case of a slit 33b of the present example, as opposed to the second example described above, the circumferential length of the sub-section 35a on the axially center side of this outer column 11b is greater than the circumferential length of the sub-section 35b on the front end periphery side of the outer column 11b. In the case of such a present example, regardless of the front-rear position of the steering wheel, the rigidity of the pair of elastic deformation sections 36a present on both sides of the principle section 34 can be made substantially constant about the axial direction of the outer column 11b. That is to say, in a portion in the vicinity of the front end periphery of the outer column 11b, the rigidity is originally lower than that in a portion close to the axially center section thereof. Consequently, by regulating the circumferential length of both of the sub-sections 35a and 35b as described above, the rigidity of both of the elastic deformation sections 36a can be made substantially constant about the axial direction of the outer column 11b. In this way, regardless of the front-rear position of the steering wheel, a significant difference will not occur in an operating force to be applied to the adjustment lever 15a in order to fix this front-rear position.

(3) Fourth Example Shown in FIG. 26(C)

In the case of a slit 33c of the present example, there are formed bent sections 50 that are respectively bent at right angle toward the side where the principle section 34 exists from the end section of the pair of sub-sections 35 provided on both of the end sections of the principle section 34. In the case of the present example, with such bent sections 50, the rigidity of elastic deformation sections 36b present on both sides of the principle section 34 is reduced and thereby there is achieved a reduction in the force required for pressing both of these elastic deformation sections 36b against the outer circumferential surface of the inner column 12b. In other words, the supporting rigidity of the outer column 11b with respect to the inner column 12b can be made high in a case where the operating force to be applied to the adjustment lever is the same.

(4) Fifth Example Shown in FIG. 26(D)

Figure 27A:
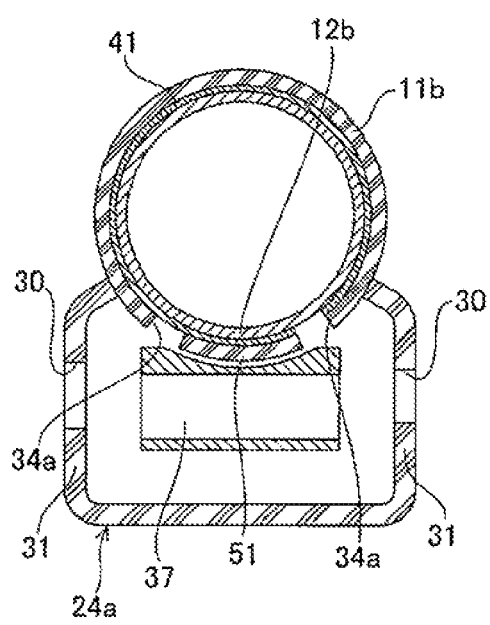
Figure 27B:
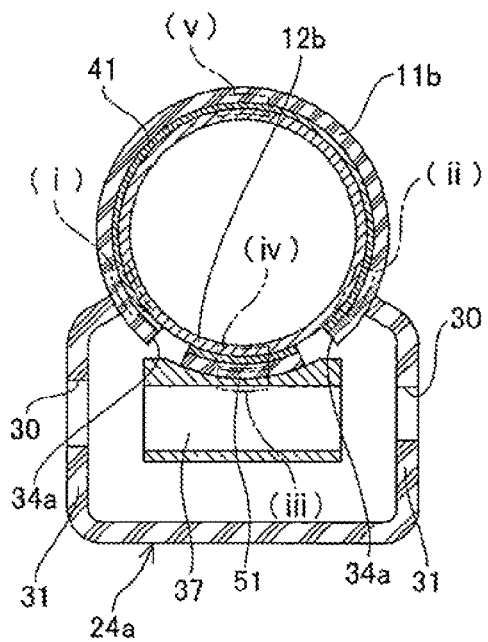
Figure 28:
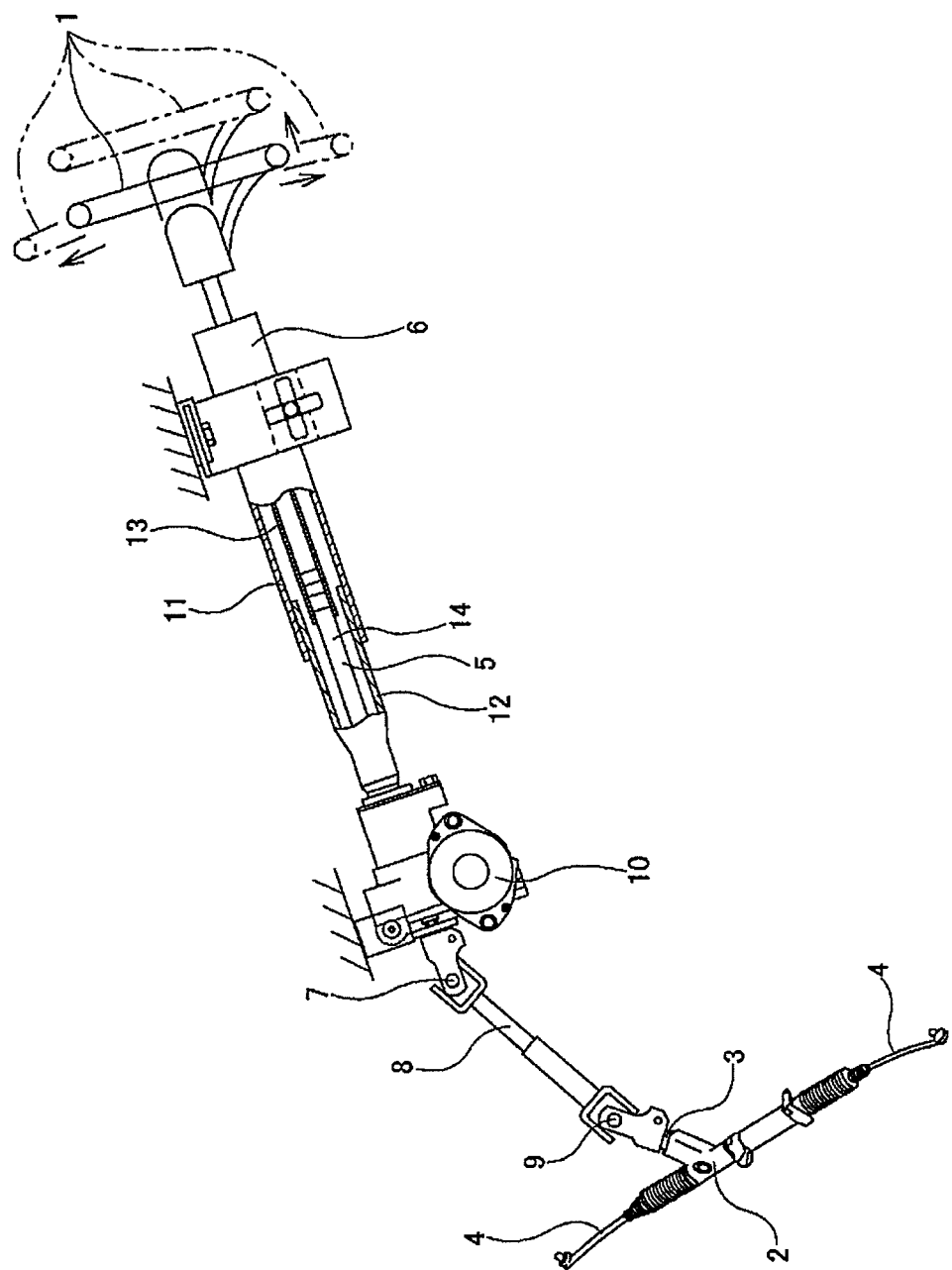
FIG. 28 is a partly cut side view showing an example of a steering wheel apparatus for an automobile with a telescopic steering column apparatus assembled therein.
Figure 29:
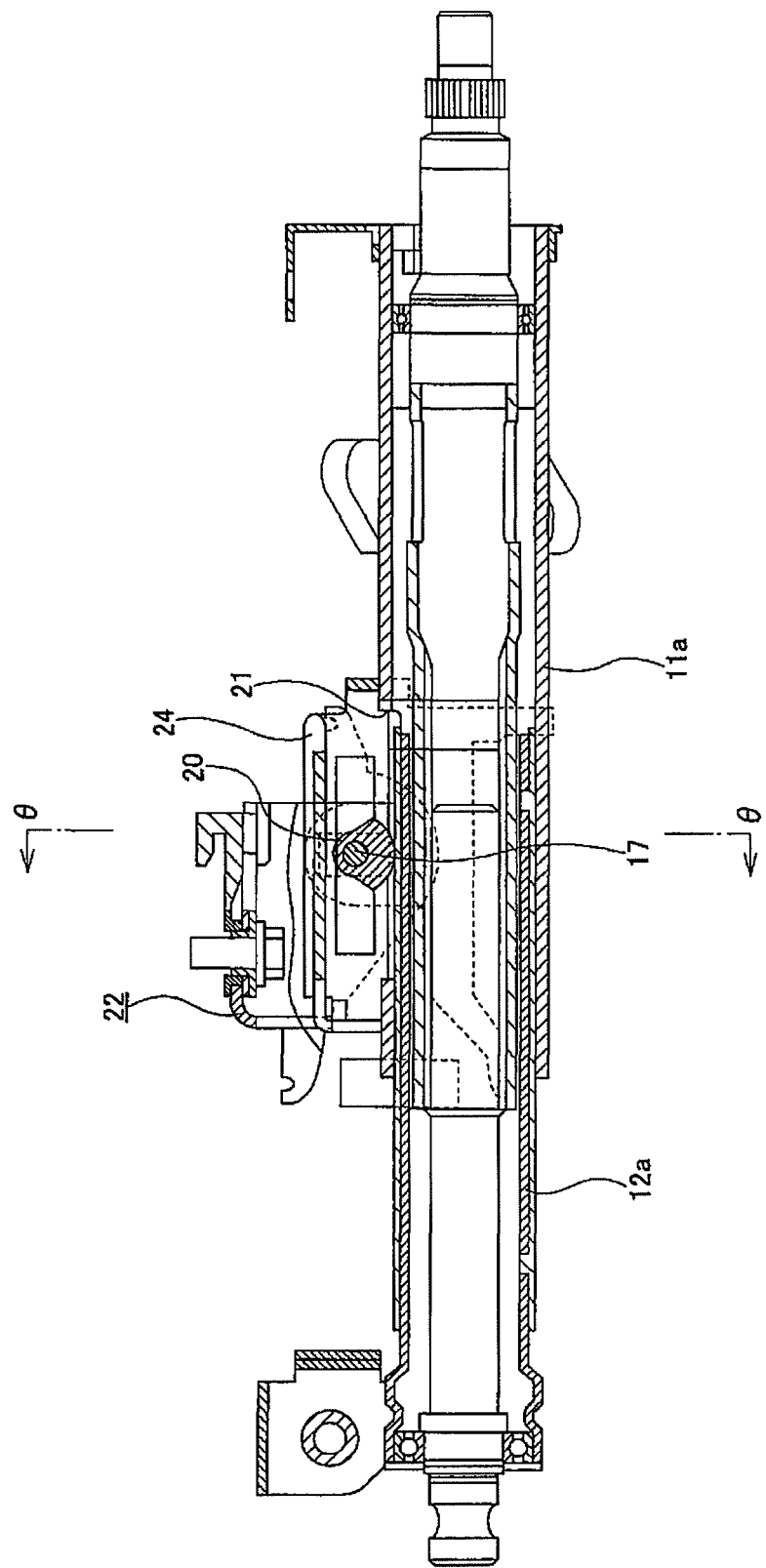
FIG. 29 is a vertical sectional side view showing an example of a conventional structure.
Figure 30:
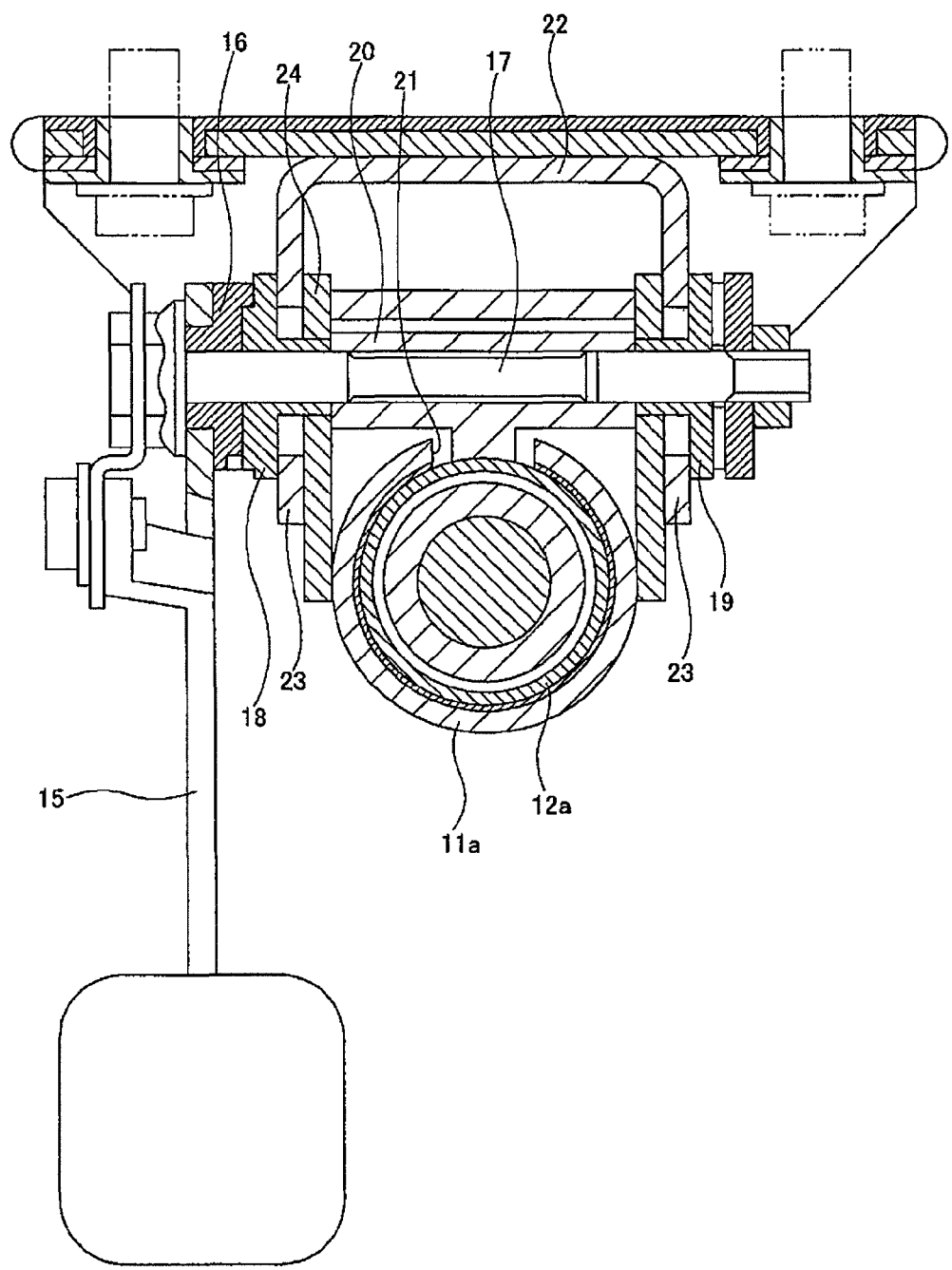
FIG. 30 is an enlarged sectional view taken along the line θ-θ of FIG. 29.

In the case of a slit 33d of the present example, from both of the end sections of two principle sections 34a that are parallel to each other, there are formed sub-sections 35 in mutually opposite directions. Moreover, a portion between both of these principle sections 34a serves as a center elastic deformation section 51. In the case of such a present example, when fixing the front-rear position of the steering wheel, the center elastic deformation section 51 is pressed against the outer circumferential surface of the inner column 12b as shown in FIG. 27(A) to (B). At this time, the widthwise dimension about the circumferential direction of both of the principle sections 34a, is reduced. Also in the case of such a present example, displacement portions and non-displacement portions are brought into frictional engagement in five positions (i) to (v) in FIG. 27(B), and it is therefore possible to achieve a higher supporting strength and supporting rigidity of the outer column 11b with respect to the inner column 12b compared to the conventional structure disclosed in Patent Document 1.

(5) Sixth Example Shown in FIG. 26(E)

In the case of a slit 33e of the present example, in a portion close to the axially center of the outer column 11b, the end sections of the pair of principle sections 34a are made continuous, and on this end section side, a center elastic deformation section 51a serves as a free end. Therefore, the rigidity of this center elastic deformation section 51a about the radial direction of the outer column 11b can be lowered, and it is possible to achieve a higher supporting strength and supporting rigidity of the outer column 11b with respect to the inner column 12b in a case where the operating force to be applied to the adjustment lever is the same. If the free end of the center elastic deformation section 51a is on the front end side of the outer column 11b as opposed to FIG. 26(E), it is possible, regardless of the front-rear position of the steering wheel, to disallow significant changes in the supporting rigidity of the outer column 11b with respect to the inner column 12b, as with the second example shown in the FIG. 26(A) described above.

(6) Seventh Example Shown in FIG. 26(F)

In the case of a slit 33f of the present example, three principle sections 34a and 34b parallel to each other are formed to thereby provide a pair of center elastic deformation sections 51b parallel to each other. Both of these center elastic deformation sections 51b deform easily in the radial direction of the outer column 11b since the widthwise dimension in the circumferential direction is small, and the supporting strength and supporting rigidity of the outer column 11b with respect to the inner column 12b can be made high in a case where the operating force to be applied to the adjustment lever is the same.

(7) Eighth Example Shown in FIG. 26(G)

A slit 33g of the present example is such that the width in the circumferential direction of a center elastic deformation section 51c is greater compared to the structure of the fifth example shown in FIG. 26(D) described above, so that a frictional area between the inner circumferential surface of this center elastic deformation section 51c and the outer circumferential surface of the inner column 12b can be ensured. Moreover, each of sub-sections 35d extends to a portion between the pair of principle sections 34a, and thereby the widthwise dimension of both of the end sections of the center elastic deformation sections 51c is narrowed and the rigidity of this center elastic deformation section 51c about the radial direction of the outer column 11b is reduced. According to such a structure of the present example, compared to the structure of the fifth example described above, the supporting strength and supporting rigidity of the outer column 11b with respect to the inner column 12b can be made higher in a case where the operating force to be applied to the adjustment lever is the same.

(8) Ninth Example Shown in FIG. 26(H)

In the case of a slit 33h of the present example, in a portion close to the axially center of the outer column 11b, the end sections of the pair of principle sections 34a are made continuous, and on this end section side, a center elastic deformation section 51c serves as a free end. Therefore, the rigidity of this center elastic deformation section 51c about the radial direction of the outer column 11b can be lowered, and it is possible to achieve a higher supporting strength and supporting rigidity of the outer column 11b with respect to the inner column 12b in a case where the operating force to be applied to the adjustment lever is the same. Also in the case of the present example, if the free end of the center elastic deformation section 51c is on the front end side of the outer column 11b as opposed to FIG. 26(H), it is possible, regardless of the front-rear position of the steering wheel, to disallow significant changes in the supporting rigidity of the outer column 11b with respect to the inner column 12b, as with the second example shown in FIG. 26(A) described above.

(9) Tenth Example Shown in FIG. 26(I)

In the case of the present example, a principle section 34c is formed in a portion detached from the pressing member 37 (or a cam member) in the circumferential direction of the outer column 11b, and a pair of sub-sections 35e are provided in parallel with each other from both of the end sections of the principle section 34c toward the side on which the pressing member 37 (or a cam member) is installed, thereby making the shape of a slit 33i channel-shape. Moreover, a portion surrounded by this slit 33i from three directions serves as a single elastic deformation section 36c. Also in the case of such a present example, the pressing member 37 (or cam member) presses this elastic deformation section 36c against the outer circumferential surface of the inner column 12b, and thereby the front-rear position of the steering wheel can be fixed in a post-adjustment position.

(10) Eleventh Example Shown in FIG. 26(J)

In the case a slit 33j of the present example, cutout sections 52 are formed at the distal end portions of the pair of sub-sections 35e away from the principle section 34c in directions of approaching to each other from the distal end portions, and the rigidity of the elastic deformation section 36c about the radial direction of the outer column 11b is reduced. According to such a structure of the present example, compared to the structure of the tenth example described above, the supporting strength and supporting rigidity of the outer column 11b with respect to the inner column 12b can be made higher in a case where the operating force to be applied to the adjustment lever is the same.

(11) Twelfth Example Shown in FIG. 26(K)

In the case of the present example, the sub-section 35 is only provided on the rear end section side of the principle section 34 that constitutes a slit 33k, and the front end section side of the principle section 34 reaches the end section of the outer column 11b and forms an open end. In the case of such a present example, regardless of the front-rear position of the steering wheel, the rigidity of the pair of elastic deformation sections 36a present on both sides of the principle section 34 can be made substantially constant about the axial direction of the outer column 11b without forming the sub-section 35 on the front end section side of the principle section 34. That is to say, because the principle section 34 forms an open end, the portion in the vicinity of the front end periphery of the outer column 11b can be made low as with the first example in which the sub-section 35 is formed. In this way, regardless of the front-rear position of the steering wheel, a significant difference will not occur in an operating force to be applied to the adjustment lever 15a in order to fix this front-rear position.

INDUSTRIAL APPLICABILITY

In the respective illustrated examples, except for the eleventh embodiment, showing the embodiment of the present invention, the long hole is provided in the movable bracket, which serves as the nipped bracket, and the circular through hole is provided in the fixed bracket, which serves as the nipping bracket. However, conversely, a circular through hole may be provided in the nipped bracket and a long hole may be provided in the nipping bracket.

Moreover, the present invention may be carried out in combination not only with a telescopic steering column apparatus for adjusting only the front-rear position of the steering wheel but also with a tilting type steering apparatus for adjusting the upper-lower position of the steering wheel. In a case of combining with a tilting type steering apparatus, for example, in FIG. 1, the holes to be formed in the mutually matching positions on the pair of supporting plate sections 23a are made as long holes that are long in the upper-lower direction, and the non-rotating cam plate 25 is engaged with the long hole formed in one of (left side in FIG. 1) the supporting plate sections 23a while only allowing it to move along this long hole (disallowing rotation).

The invention claimed is:

1. A telescopic steering column apparatus comprising:
a cylindrical inner column;
an outer column that is of a cylindrical shape with a diameter greater than that of the inner column and that is externally fitted on the inner column so as to be able to be displaced in the axial direction;
a nipped bracket that is fixed on a lower surface or upper surface of a portion of the outer column that is externally fitted on the inner column and that has a widthwise dimension greater than the outer diameter of the outer column;
a nipping bracket that has a pair of supporting plate sections that nip the nipped bracket from both sides thereof in the widthwise direction, and that is supported on a vehicle body;
a rod-shaped member that is inserted through throughholes provided in mutually matching portions on the nipped bracket and the nipping bracket, in the widthwise direction of the nipped bracket;
a pair of pressing sections that are provided on portions that oppose, on both end sections of the rod-shaped member, to the outer side surface of both of the supporting plate sections;
an engagement/disengagement device that increases or reduces the distance between both of the pressing sections as the rod-shaped member is rotated in the torsional direction, to thereby engage or disengage the inner side surface of both of the supporting plate sections and both of the side surfaces of the nipped bracket;
a slit that is formed in a portion of the outer column opposing to the intermediate section of the rod-shaped member, and that is long in the axial direction of the outer column; and
a pressing member that is provided in a portion of the intermediate section of the rod-shaped member that opposes to the outer column, and that presses, radially inward, the outer circumferential surface of the outer column as the rod-shaped member is rotated;
wherein a distance between the rotational center axis of the rod-shaped member and the outer circumferential surface of a portion of the intermediate section of the rod-shaped member that opposes to the outer circumferential surface of the outer column, is unequal about the rotational direction of the rod-shaped member; the pressing member is arranged between the intermediate section of the rod-shaped member and the outer column; and as the rod-shaped member is rotated in a direction of reducing the distance between the pair of pressing sections, the outer circumferential surface of the intermediate section of the rod-shaped member presses the pressing member toward a portion of the outer circumferential surface of the outer column where the slit is formed.

2. A telescopic steering column apparatus according to claim 1, wherein a front end section of the outer column is externally fitted on a rear end section of the inner column, and the holes provided in the nipped bracket is made as a hole that extends in the axial direction of the outer column.

3. A telescopic steering column apparatus according to claim 2, wherein: in a portion of the pressing member that opposes to the outer column, there is provided a partly cylindrical concave section in which, in the axial direction of the rod-shaped member, the center section thereof is deep and the concave section gradually becomes shallower as the concave section gets closer to both of the end sections thereof; and the concave section is brought into contact with the outer circumferential surface of the outer column in a state of spanning both side portions of the slit.

4. A telescopic steering column apparatus according to claim 2, wherein the pressing member is a cam member that is supported on the intermediate section of the rod-shaped member and that rotates together with the rod-shaped member; and with rotation of the rod-shaped member in a direction of reducing the distance between the pair of pressing sections, the cam member presses a portion on the outer circumferential surface of the outer column where the slit is formed.

5. A telescopic steering column apparatus according to claim 4, wherein in a portion of the cam member that opposes to the outer column, there is provided a cylindrical concave section in which, in the axial direction of the rod-shaped member, the center section thereof is deep and the concave section gradually becomes shallower as the concave section gets closer to both of the end sections thereof; and the concave section is brought into contact with the outer circumferential surface of the outer column in a state of spanning both side portions of the slit.

6. A telescopic steering column apparatus according to claim 4, wherein: in portions in two positions distanced from each other in the axial direction of the rod-shaped member that oppose to both of the side portions of the slit of the outer column, there are provided a pair of the cam members in a state of preventing displacement in a direction of moving away from each other; and with the tip end section of both of these cam members, both of the side portions of the slit on the outer circumferential surface of the outer column are pressed.

7. A telescopic steering column apparatus according to claim 6, wherein the side surfaces on mutually opposite sides of the pair of the cam members are respectively brought into contact with the inner side surfaces of a pair of supporting plate sections that constitute the nipping bracket.

8. A telescopic steering column apparatus according to claim 4, wherein the cam members are made as an integrated type in which a pair of cam pieces are joined and fixed with a joining section.

9. A telescopic steering column apparatus according to claim 4, wherein: a distance between the rotational center axis of the rod-shaped member and the outer circumferential surface of a portion of the intermediate section of the rod-shaped member that opposes to the outer circumferential surface of the outer column, is unequal about the rotational direction of the rod-shaped member; another pressing member, which is a separate member from the cam member, is arranged between the intermediate section of the rod-shaped member and the outer column; and with rotation of the rod-shaped member in a direction of reducing the distance between the pair of pressing sections, the outer circumferential surface of the outer column is pressed by the cam member, and at the same time, the pressing member is pressed toward a portion of the outer circumferential surface of the outer column where the slit is formed, by the outer circumferential surface of the intermediate section of the rod-shaped member.

10. A telescopic steering column apparatus according to claim 1, wherein: in portions in two positions distanced from each other in the axial direction of the rod-shaped member that oppose to both of the side portions of the slit of the outer column, there are provided a pair of pressing members in a state of preventing displacement in a direction of moving away from each other; and parts of both of these pressing members are brought into contact with both of the side portions of the slit of the outer circumferential surface of the outer column.

11. A telescopic steering column apparatus according to claim 10, wherein the side surfaces on mutually opposite sides of the pair of the pressing members are respectively brought into contact with the inner side surfaces of a pair of side plate sections that constitute the nipped bracket.

12. A telescopic steering column apparatus according to claim 1, wherein a rear end section of the outer column is externally fitted on a front end section of the inner column.

13. A telescopic steering column apparatus comprising:
a cylindrical inner column;
an outer column that is of a cylindrical shape with a diameter greater than that of the inner column and that is externally fitted on the inner column so as to be able to be displaced in the axial direction;
a nipped bracket that is fixed on a lower surface or upper surface of a portion of the outer column that is externally fitted on the inner column and that has a widthwise dimension greater than the outer diameter of the outer column;
a nipping bracket that has a pair of supporting plate sections that nip the nipped bracket from both sides thereof in the widthwise direction, and that is supported on a vehicle body;
a rod-shaped member that is inserted through through-holes provided in mutually matching portions on the nipped bracket and the nipping bracket, in the widthwise direction of the nipped bracket;
a pair of pressing sections that are provided on portions that oppose, on both end sections of the rod-shaped member, to the outer side surface of both of the supporting plate sections;
an engagement/disengagement device that increases or reduces the distance between both of the pressing sections as the rod-shaped member is rotated in the torsional direction, to thereby engage or disengage the inner side surface of both of the supporting plate sections and both of the side surfaces of the nipped bracket;
a slit that is formed in a portion of the outer column opposing to the intermediate section of the rod-shaped member, and that is long in the axial direction of the outer column; and
a pressing member that is provided in a portion of the intermediate section of the rod-shaped member that opposes to the outer column, and that presses, radially inward, the outer circumferential surface of the outer column as the rod-shaped member is rotated;
wherein a front end section of the outer column is externally fitted on a rear end section of the inner column, and the holes provided in the nipped bracket, is made as a hole that extends is long in the axial direction of the outer column;
wherein the pressing member is a cam member that is supported on the intermediate section of the rod-shaped member and that rotates together with the rod-shaped member; and with rotation of the rod-shaped member in a direction of reducing the distance between the pair of pressing sections, the cam member presses a portion on the outer circumferential surface of the outer column where the slit is formed.

14. A telescopic steering column apparatus according to claim 13, wherein in a portion of the cam member that opposes to the outer column, there is provided a cylindrical concave section in which, in the axial direction of the rod-shaped member, the center section thereof is deep and the concave section gradually becomes shallower as the concave section gets closer to both of the end sections thereof; and the concave section is brought into contact with the outer circumferential surface of the outer column in a state of spanning both side portions of the slit.

* * * * *